(12) United States Patent
Matsushima et al.

(10) Patent No.: US 9,411,077 B2
(45) Date of Patent: Aug. 9, 2016

(54) LENTICULAR LENS SHEET, DISPLAY APPARATUS AND ELECTRONIC EQUIPMENT

(71) Applicant: NLT TECHNOLOGIES, LTD., Kawasaki, Kanagawa (JP)

(72) Inventors: Jin Matsushima, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/800,297

(22) Filed: Jul. 15, 2015

(65) Prior Publication Data

US 2016/0018566 A1    Jan. 21, 2016

(30) Foreign Application Priority Data

Jul. 16, 2014    (JP) ................. 2014-145589

(51) Int. Cl.
| | |
|---|---|
| G02B 27/10 | (2006.01) |
| G02B 27/22 | (2006.01) |
| G03B 27/32 | (2006.01) |
| G02B 3/00 | (2006.01) |

(52) U.S. Cl.
CPC .............. *G02B 3/005* (2013.01); *G02B 3/0068* (2013.01); *G02B 3/0018* (2013.01); *G02B 3/0031* (2013.01); *G02B 27/22* (2013.01); *G02B 27/2214* (2013.01)

(58) Field of Classification Search
CPC ........ G02B 3/00; G02B 3/0006; G02B 3/005; G02B 3/0018; G02B 3/0031; G02B 3/0068; G02B 3/0095; G02B 27/10; G02B 27/22; G02B 27/2214; G03B 3/10; G03B 27/32; G03B 35/14; G03B 35/24
USPC ............. 359/618–623; 355/22, 77; 348/208.2
See application file for complete search history.

(56) References Cited

U.S. PATENT DOCUMENTS

| | | | | |
|---|---|---|---|---|
| 7,859,757 B2 * | 12/2010 | Yamamura | ............... | B41J 2/451 359/621 |
| 8,508,852 B2 * | 8/2013 | Okumura | ................. | G02B 3/06 359/619 |
| 8,817,202 B2 * | 8/2014 | Okumura | ......... | B29D 11/00365 349/57 |
| 2008/0068720 A1 | 3/2008 | Shigemura et al. | | |
| 2009/0116116 A1 | 5/2009 | Tomikawa et al. | | |

FOREIGN PATENT DOCUMENTS

| | | |
|---|---|---|
| JP | 2008-070760 A | 3/2008 |
| JP | 2009-115920 A | 5/2009 |
| JP | 2011-232446 A | 11/2011 |

* cited by examiner

*Primary Examiner* — Loha Ben
(74) *Attorney, Agent, or Firm* — Sughrue Mion, PLLC

(57) ABSTRACT

Provided are a lenticular lens sheet capable of simultaneously achieving an improvement in visibility due to improving bonding accuracy, and low cost due to shape stabilization during processing the lens, a display apparatus and an electronic equipment including the same. The lenticular lens sheet includes a plurality of cylindrical lenses which extend in a direction parallel to each other; and an alignment mark which has two cylindrical lenses among the plurality of cylindrical lenses, a flat part disposed between the two cylindrical lenses, and a structure which is disposed on the flat part and extends between the two cylindrical lenses.

13 Claims, 55 Drawing Sheets

△ BOUNDARY WITH SIMILAR BOUNDARY CLOSE THERETO

△ BOUNDARY WITH SIMILAR BOUNDARY CLOSE THERETO

BOUNDARY WITH NO SIMILAR BOUNDARY CLOSE THERETO

BOUNDARY WITH SIMILAR BOUNDARY CLOSE THERETO

◯ BOUNDARY WITH NO SIMILAR
  BOUNDARY CLOSE THERETO

◯ BOUNDARY WITH NO SIMILAR BOUNDARY CLOSE THERETO

LENTICULAR LENS SHEET, DISPLAY APPARATUS AND ELECTRONIC EQUIPMENT

CROSS-REFERENCE TO RELATED APPLICATIONS

This non-provisional application claims priority under 35 U.S.C. §119(a) on Patent Application No. 2014-145589 filed in Japan on Jul. 16, 2014, the entire contents of which are hereby incorporated by reference.

FIELD

The present invention relates to a lenticular lens sheet used in a display apparatus capable of displaying different images from a plurality of viewpoints, a display apparatus including the lenticular lens sheet and an electronic equipment including the display apparatus. In particular, the present invention relates to an alignment mark of a lenticular lens sheet.

BACKGROUND

A stereoscopic display apparatus using a display panel such as a liquid crystal panel having a plurality of pixels based on a glass substrate, an organic electroluminescence (EL) panel, plasma display panel (PDP), or the like, and a lenticular lens sheet has been proposed. In order to obtain high stereoscopic display characteristics in the stereoscopic display apparatus using a lenticular lens sheet, when bonding the lenticular lens sheet to a display panel, it is necessary to align the pixel of the display panel with the lens of the lenticular lens sheet with high accuracy. In order to align the display panel with the lenticular lens sheet with high accuracy, it is necessary to dispose alignment marks on at least two regions, with no mark similar to the alignment mark in the vicinity of each of the alignment marks, and more high visibility of the alignment mark is required.

In Japanese Patent Application Laid-Open No. 2008-070760 (hereinafter, referred to as Patent Document 1), as illustrated in FIG. 1, a lenticular lens sheet 100 includes cylindrical lenses 101 and non-periodic flat parts 102 introduced parallel to an extending direction of the cylindrical lenses 101, and the non-periodic flat parts 102 are made to serve as an alignment mark for an X-axis direction. Herein, X and Y arrows on a right side of FIG. 1 illustrate the X-axis direction and a Y-axis direction, respectively. FIG. 2 is an enlarged front view illustrating the alignment mark of the lenticular lens sheet 100. The dot hatching regions of FIG. 2 represent portions having the surface formed in a curved surface.

When aligning the display panel with the lenticular lens sheet with high accuracy, generally, the alignment marks of the lenticular lens sheet 100 are observed by a charge coupled device (CCD) camera. In particular, when observing the alignment marks by epi-illumination light, since there is a difference in brightness or color enough to allow recognition of the non-periodic flat parts 102 and the cylindrical lens 101, it is possible to recognize a boundary between the non-periodic flat part 102 and the cylindrical lens 101 by a simple image recognition device in a short time with high accuracy. The reason is that a lot of epi-illumination lights are reflected toward the CCD camera on a flat part, but the epi-illumination light reflected toward the CCD camera on the curved surface is decreased compared to the flat part.

Further, when observing the non-periodic flat part 102, and a line of intersection between a surface of the non-periodic flat part 102 and a surface of the cylindrical lens 101, it is possible to easily focus to the line of intersection between the non-periodic flat part 102 and the cylindrical lens 101 by the CCD camera using transmitted light and the epi-illumination light.

Japanese Patent Application Laid-Open No. 2011-232446 (hereinafter, referred to as Patent Document 2) discloses three methods relating to the alignment mark, which will be respectively described as Method A, Method B and Method C below.

In Method A of Patent Document 2, as illustrated in FIG. 3, an X-direction cylindrical lens 104 having an extending direction perpendicular to the extending direction of Y-direction cylindrical lens 103 is introduced to a lenticular lens sheet 100a including the Y-direction cylindrical lens 103, and the X-direction cylindrical lens 104 is made to serve as an alignment mark. The X-direction cylindrical lens 104 has a smaller pitch and a smaller height of a lens than the Y-direction cylindrical lens 103. The dot hatching regions of FIG. 3 represent portions having the surface formed in a curved surface. FIG. 4 is an enlarged perspective view illustrating the alignment mark of the lenticular lens sheet 100a. FIG. 5 is a cross-sectional view illustrating the lenticular lens sheet 100a taken on line A-A' illustrated in FIG. 3.

In Method B of Patent Document 2, as illustrated in FIG. 6, an X-direction flat part 105 having an extending direction perpendicular to the extending direction of Y-direction cylindrical lens 103 is introduced to a lenticular lens sheet 100b including the Y-direction cylindrical lens 103, and the X-direction flat part 105 is made to serve as an alignment mark. The dot hatching regions of FIG. 6 represent portions having the surface formed in a curved surface. FIG. 7 is an enlarged perspective view illustrating the alignment mark of the lenticular lens sheet 100b. FIG. 8 is a cross-sectional view illustrating the lenticular lens sheet 100b taken on line B-B' illustrated in FIG. 6.

In Method C of Patent Document 2, as illustrated in FIG. 9, an X-direction cylindrical lens 104 having an extending direction perpendicular to the extending direction of Y-direction cylindrical lens 103 is introduced to a lenticular lens sheet 100c including the Y-direction cylindrical lens 103. Further, a Y-direction cylindrical lens 103a having an extending direction parallel to the extending direction of the Y-direction cylindrical lens 103 are introduced thereto. The X-direction cylindrical lens 104 and the Y-direction cylindrical lens 103a have a smaller pitch and a smaller height of a lens than the Y-direction cylindrical lens 103, respectively. The X-direction cylindrical lens 104 and the Y-direction cylindrical lens 103a are made to serve as an alignment mark. The dot hatching regions of FIG. 9 represent portions having the surface formed in a curved surface. FIG. 10 is an enlarged perspective view illustrating a region in which the X-direction cylindrical lens 104 and the Y-direction cylindrical lens 103a of the lenticular lens sheet 100c are crossed with each other.

In a method disclosed in Japanese Patent Application Laid-Open No. 2009-115920 (hereinafter, referred to as Patent Document 3), as illustrated in FIG. 11, a flat part 106 is introduced to a lenticular lens sheet 100d including Y-direction cylindrical lens 103. The flat part 106 is, unlike Patent Document 1, only partially formed, and is made to serve as an alignment mark. The dot hatching regions of FIG. 11 represent portions having the surface formed in a curved surface. FIG. 12 is an enlarged perspective view illustrating the alignment mark of the lenticular lens sheet 100d.

In the respective Patent Documents 1 to 3, the alignment is performed using the alignment mark of the display panel and the alignment mark introduced to the lenticular lens sheet.

In Patent Documents 1 and 2, the lenticular lens sheets made of a resin having excellent cost performance are used in the stereoscopic display apparatus. However, in the lenticular lens sheet made of a resin, when the temperature of the display apparatus is increased, thermal expansion coefficients of the resin and the glass are different from each other by 10 times or more. Therefore, a pitch or a positional relationship between display pixels on the glass substrate and the lenses of the lenticular lens sheet is deviated from a design value, thereby causing a problem that the stereoscopic display fails. Therefore, a lenticular lens sheet having patterns of an ultraviolet curing resin prepared on one surface of the glass substrate has been considered. Since thermal expansion of the lenticular lens sheet using the glass substrate is suppressed to an extent equal to the glass substrate, the considered lenticular lens sheet becomes an effective countermeasure means with respect to the above-described problems.

In the lenticular lens sheet 100 of Patent Document 1, by observing the alignment mark by the CCD camera using epi-illumination light, it is possible to simply recognize the boundary between the non-periodic flat part 102 and the cylindrical lens 101 as illustrated in FIG. 2, and perform the alignment in an X direction with high accuracy. However, the method of Patent Document 1 is effective in the X direction, but since there is no mark to be a reference of the Y direction, it is not possible to perform the alignment in the Y direction. Therefore, when the lenticular lens sheet 100 is adhered, in particular, to the display panel with a narrow frame, the lenticular lens sheet 100 may protrude from the display panel with respect to the Y-direction, which becomes a factor in terms of decreasing yields.

FIG. 13 is an enlarged front view illustrating the alignment mark of the lenticular lens sheet 100a of Method A of Patent Document 2. The dot hatching regions of FIG. 13 represent portions having the surface formed in a curved surface. In the lenticular lens sheet 100a of Method A of Patent Document 2, the surfaces of the Y-direction cylindrical lens 103 and the X-direction cylindrical lens 104 are curved surfaces. Accordingly, even when observing the alignment marks of the lenticular lens sheet 100a by the CCD camera using the epi-illumination light, as illustrated in FIG. 13, the Y-direction cylindrical lens 103 and the X-direction cylindrical lens 104 are seen at the same brightness and color as each other. Therefore, it is difficult to recognize the boundary between the Y-direction cylindrical lens 103 and the X-direction cylindrical lens 104 by a simple image recognition device in a short time with high accuracy. Also, it is difficult to focus to the line of intersection (for example, the line of intersection with the adjacent Y-direction cylindrical lens 103) between the curved surfaces by the CCD camera, compared to the case of focusing to the line of intersection between the flat part and the curved surface using the transmitted light and the epi-illumination light. That is, in the case of the line of intersection between the flat part and the curved surface, the flat part and the line of intersection are present on the same focus position as each other, such that it is possible to focus thereto using both thereof. Meanwhile, in the case of the line of intersection between the curved surfaces, it is necessary to focus only using the line of intersection. Further, since there are many boundaries between the Y-direction cylindrical lens 103 and the X-direction cylindrical lens 104 having the same shape as each other close thereto (boundaries having a similar boundary close thereto are surrounded by a triangle), it is difficult to determine a position of the boundary to which the observed boundary belongs. Accordingly, Method A of Patent Document 2 is insufficient as the alignment mark.

FIG. 14 is an enlarged front view illustrating the alignment mark of the lenticular lens sheet 100b of Method B of Patent Document 2. The dot hatching regions of FIG. 14 represent portions having the surface formed in a curved surface. In the lenticular lens sheet 100b of Method B of Patent Document 2, when observing the alignment mark by the CCD camera using the epi-illumination light, as illustrated in FIG. 14, it is possible to recognize the boundary between the Y-direction cylindrical lens 103 and the X-direction flat part 105 by a simple image recognition device in a short time with high accuracy. However, since there are many boundaries between the Y-direction cylindrical lens 103 and the X-direction flat part 105 having the same shape as each other close thereto (boundaries having a similar boundary close thereto are surrounded by a triangle, similar to FIG. 13), it is difficult to determine a position of the boundary to which the observed boundary belongs. Accordingly, Method B of Patent Document 2 is also insufficient as the alignment mark.

FIG. 15 is an enlarged front view illustrating the alignment mark of the lenticular lens sheet 100c of Method C of Patent Document 2. The dot hatching regions of FIG. 15 represent portions having the surface formed in a curved surface. In the lenticular lens sheet 100c of Method C of Patent Document 2, as illustrated in FIG. 15, since the boundaries between the Y-direction cylindrical lenses 103 and 103a and the X-direction cylindrical lens 104 having boundaries with no similar boundary close thereto are present (portions surrounded by a circle in FIG. 15), it is possible to determine a position of the boundary to which the observed boundary belongs. However, as the surfaces of the Y-direction cylindrical lenses 103 and 103a and the X-direction cylindrical lens 104 are the curved surfaces, it is difficult to recognize the boundary by a simple image recognition device in a short time. Further, it is difficult to focus to the line of intersection between the curved surfaces using the transmitted light and the epi-illumination light, compared to the case of focusing to the line of intersection between the flat part and the curved surface. Accordingly, Method C of Patent Document 2 is also insufficient as the alignment mark.

FIG. 16 is an enlarged front view illustrating the alignment mark of the lenticular lens sheet 100d of Patent Document 3. The dot hatching regions of FIG. 16 represent portions having the surface formed in a curved surface. With the lenticular lens sheet 100d of Patent Document 3, as illustrated in FIG. 16, since the boundaries between the Y-direction cylindrical lens 103 and the flat part 106 having different shapes from each other are present (portions surrounded by a circle in FIG. 16), it is possible to determine a position of the boundary to which the observed boundary belongs. Further, when observing the alignment mark by the CCD camera using the epi-illumination light, as illustrated in FIG. 16, it is possible to recognize the boundary between the Y-direction cylindrical lens 103 and the flat part 106 by a simple image recognition device in a short time with high accuracy. However, it is generally difficult to process the boundary between the Y-direction cylindrical lens 103 and the flat part 106 in the Y direction in a shape so as to be abruptly changed from the cylindrical lens to the flat part, as the lenticular lens sheet 100d of Patent Document 3. Reasons therefor will be described below.

In general, when preparing a lenticular lens sheet at a low cost, a method of transferring the shape of a mold to a resin is used. In order to prepare the lenticular lens sheet 100d, a mold having a shape in which the lenticular lens sheet 100d is inverted is required.

FIGS. 17 and 18 illustrate perspective views illustrating molds necessary for preparing the lenticular lens sheet 100d of Patent Document 3. FIG. 17 is a perspective view illustrating a mold having an ideal shape, but difficult to process at a low cost, and FIG. 18 is a perspective view illustrating a mold capable of being processed at a low cost, but having a practical shape (also referred to as a non-ideal shape). Herein, the mold of FIG. 17 corresponds to FIG. 12. FIG. 19 is a cross-sectional view taken on line C-C' illustrating a fabrication process of the mold of FIG. 18, and the dot hatching region of FIG. 19 represents a portion having the surface formed in a curved surface.

As illustrated in FIG. 19, in order to form a prescribed lens pattern on the mold, a concave cylindrical lens forming part 103b is cut out in the mold by a tool bit (cutting tool) 107 having a cross-section formed in a U shape in the X direction. In order to protect the tool bit 107, it is necessary to move the tool bit 107 up and down at a gentle angle with respect to a processing surface, while not allowing the tool bit to vertically move up and down from the mold at the beginning and ending of the cutting of the cylindrical lens forming part 103b. Thereby, the boundary between the Y-direction cylindrical lens forming part 103b and a flat-part forming part 106b in the Y direction is gradually changed from the cylindrical lens to the flat part, as illustrated in FIG. 18. In FIGS. 17 and 18, to highlight this change, a side wall surface is illustrated by a slant-hatching. Further, the line of intersection between the flat-part forming part 106b and a curved surface which can be formed during removing the tool bit 107 is formed in a curved line (i.e., the external form of the flat-part forming part 106b is not formed in a rectangular shape).

A process of forming the curved line will be described with reference to FIG. 19, which is a cross-sectional view illustrating the mold 108 during processing along line C-C' of FIG. 18. FIG. 19 illustrates a state in which cutting of the Y-direction cylindrical lens forming part 103b in the mold 108 by the tool bit 107 begins, and is a view illustrating a process in which the tool bit 107 is inserted into the mold 108 to a processing position of the Y-direction cylindrical lens forming part 103b. The Y-direction cylindrical lens forming part 103b illustrated in FIG. 19 represents before processing, and a dotted line represents a trajectory of a cutting edge of the tool bit 107 to be processed. As illustrated in FIG. 19, in order to protect the tool bit 107, the tool bit 107 moves in a processing direction while gradually descending, and the tool bit 107 is inserted into the mold 108 at a gentle angle. When ending the cutting of the mold 108 by the tool bit 107, the operation is performed in a reverse procedure to at the time of insertion. By beginning and ending of the cutting, a processing area due to the up and down movement of the tool bit 107 is formed in a curved line as illustrated in FIG. 18. In addition, since accuracy of the mold processing may be decreased during ascending and descending of the tool bit 107, the shape of the curved line as illustrated in FIG. 18 prepared by this process becomes unstable.

Moreover, in the case of a shape in which the boundary between the Y-direction cylindrical lens forming part 103b and the flat-part forming part 106b in the Y direction is rapidly changed such as an ideal mold illustrated in FIG. 17, there is a need to replace the tool bit depending on the shape, maintain the tool bit with high accuracy during replacing, and cope with a high load of the tool bit, and thereby it is difficult to process the mold at a low cost.

FIG. 20 is a perspective view illustrating the lenticular lens sheet prepared by the mold of FIG. 18 having a practical shape capable of being processed at a low cost based on Patent Document 3. FIG. 21 is a front view illustrating the lenticular lens sheet of FIG. 20. A slant-hatching region of FIG. 20 represents a portion corresponding to a side wall surface of the mold, and dot hatching regions of FIG. 21 represent portions having the surface formed in a curved surface. As illustrated in FIG. 21, the boundaries between the Y-direction cylindrical lens 103 and the flat part 106a having different shapes from each other are present, however, since curved lines 109 have an unstable shape due to the processing during an ascending and descending of the tool bit as described above, there is a case in which the boundary present therebetween cannot be recognized by a simple image recognition device in a short time with high accuracy. Accordingly, Patent Document 3 is also insufficient as the alignment mark.

In addition, an intersecting part between the Y-direction cylindrical lens 103 and the X-direction cylindrical lens 104 in FIG. 4 of Patent Document 2, an intersecting part between the Y-direction cylindrical lens 103 and the X-direction flat part 105 in FIG. 7, an intersecting part between the Y-direction cylindrical lens 103 and the X-direction cylindrical lens 104 in FIG. 10, and an intersecting part between the Y-direction cylindrical lens 103a and the X-direction cylindrical lens 104 are also difficult to be processed by the mold at a low cost as similar to Patent Document 3.

In the conventional method illustrated in Patent Documents 1 to 3, it is difficult to align the lenticular lens sheet with the display panel at a low cost with high accuracy, and bond to each other.

Further, in the lenticular lens sheet having patterns of an ultraviolet curing resin prepared on one surface of the glass substrate, since a hard lenticular lens sheet is bonded to a hard display panel, an alignment mark capable of allowing recognition in a short time with high accuracy is required, compared to the case in which the lenticular lens sheet made of a soft resin is bonded to the hard display panel.

More specifically, when bonding the lenticular lens sheet made of a soft resin to the hard display panel, the display panel is fixed on a stage, and the lenticular lens sheet is bent and gradually bonded to the display panel from one side thereof, while aligning the alignment mark of the lenticular lens sheet with the alignment mark of the display panel. Thereby, it is possible to bond the lenticular lens sheet to the display panel without forming a bubble even in the atmosphere.

Meanwhile, when bonding the hard lenticular lens sheet to the hard display panel, since it is not possible to bend the lenticular lens sheet as the lenticular lens sheet made of a resin, the lenticular lens sheet is also fixed to a different stage, in addition to fixing of the display panel to the stage. Next, in order to measure the position of the display panel on the stage and the position of the lenticular lens sheet, the position of the alignment mark is measured. Then, by using the alignment marks, the lenticular lens sheet and the display panel are bonded to each other by aligning the same with high accuracy in a vacuum. In this case, since it is necessary to align the alignment mark in the Y direction in addition to the X direction, the lenticular lens sheet requires the alignment marks capable of allowing recognition of the positions thereof in the X and Y directions by a simple image recognition device in a short time with high accuracy.

SUMMARY

In consideration of the above-mentioned circumstances, it is a major object of the present invention to provide a lenticular lens sheet capable of simultaneously achieving an improvement in visibility due to improving bonding accuracy, and low cost due to shape stabilization during processing the lens, a display apparatus and an electronic equipment including the same.

More specifically, another object of the present invention is to provide a lenticular lens sheet capable of being aligned in a Y direction with high accuracy, in addition to the highly accurate alignment in an X direction. Another object of the present invention is to provide a lenticular lens sheet capable of allowing recognition of an alignment mark by a simple image recognition device in a short time with high accuracy. Further, another object of the present invention is to provide a lenticular lens sheet allowing a simple determination of a position at which the observed alignment mark is disposed. Further, another object of the present invention is to provide a lenticular lens sheet which is able to be prepared by a mold having a practical shape capable of being processed at a low cost. Furthermore, another object of the present invention is to provide a lenticular lens sheet which is able to be, even when an optical member is made of a glass substrate, bonded to the display panel by aligning with the same.

According to one aspect of the present invention, there is provided a lenticular lens sheet, including: a plurality of cylindrical lenses which extend in a direction parallel to each other; and an alignment mark which has two cylindrical lenses among the plurality of cylindrical lenses, a flat part disposed between the two cylindrical lenses, and a structure which is disposed on the flat part and extends between the two cylindrical lenses.

According to the present invention, since the boundaries, which are formed by two cylindrical lenses having the extending direction parallel to each other, the flat part disposed between the two cylindrical lenses, and the structure extending between the two cylindrical lenses on the flat part, and have different shapes from each other, are present, it is possible to determine a position of the boundary to which the observed boundary belongs. In addition, the surfaces of the two cylindrical lenses are curved surfaces, and at least a surface contacting the flat part of the structure connecting the two cylindrical lenses is also the curved surface or inclined surface. Therefore, the flat part has a difference in brightness or color enough to allow recognition of the surface contacting the two cylindrical lenses and the structure, such that the boundaries between the flat part and the two cylindrical lenses can be recognized by a simple image recognition device in a short time with high accuracy.

In the lenticular lens sheet according to the present invention, the structure may be any one of the cylindrical lens, a hexahedron, and a prism.

According to the present invention, it is possible to easily process the alignment mark in the mold for preparing the lenticular lens sheet at a low cost.

In the lenticular lens sheet according to the present invention, the structure may intersect the flat part in two straight lines, and the two straight lines may be parallel to each other.

The configurational characteristic in which the structure intersects the flat part in two straight lines, and the two straight lines are parallel to each other means that the structure of the region on the flat part is processed in the preparing step of the mold for preparing the lenticular lens sheet without ascending and descending the tool bit. Briefly, the processed shape such as the curved line of Method C of Patent Document 2 is unstable, whereas the shape of the structure of the present invention is stable.

In the lenticular lens sheet according to the present invention, the flat part may extend in the extending direction of the cylindrical lens. In the lenticular lens sheet according to the present invention, the flat part may be present only near the structure.

According to the present invention, the flat part is present in the extending direction of the cylindrical lens, and further, the flat part forms the alignment mark of the present invention. According to the present invention, the flat part is present only near the structure, and further, the flat part forms the alignment mark of the present invention. Since the flat part is formed on only a region requiring the alignment mark, and the other regions can be formed as the cylindrical lens, there is an effect of widening the area of the cylindrical lens.

In the lenticular lens sheet according to the present invention, one alignment mark may be provided on the same flat part.

According to the present invention, even when only one alignment mark is provided on the same flat part, the alignment can be performed with high accuracy.

In the lenticular lens sheet according to the present invention, the extending direction of the cylindrical lens may be inclined with respect to sides forming an external form of the lenticular lens sheet.

The cylindrical lens whose extending direction is inclined is referred to as an oblique cylindrical lens. The present invention may also be applied to the alignment mark on the lenticular lens sheet of the oblique cylindrical lens.

In the lenticular lens sheet according to the present invention, the cylindrical lens may have a lower surface formed in a flat surface and an upper surface formed in a convex surface, and the structure has a lower height than the height of the cylindrical lens based on the lower surface.

According to the present invention, when two alignment marks are provided on the same flat part, even if a protection film is bonded to the surface of the lenticular lens sheet for preventing scratches or contamination, a gap can be maintained between the structure and the protection film. Accordingly, even when the pressure in an environment is reduced while the protection film is bonded to the lenticular lens sheet, air can escape through a leakage path, and peeling-off of the protection film can be prevented due to the pressure of the air trapped therein.

In the lenticular lens sheet according to the present invention, two or more alignment marks may be provided on the lenticular lens sheet.

According to the present invention, by using the two or more alignment marks provided on the lenticular lens sheet, it is possible to align the X and Y directions with high accuracy.

In the lenticular lens sheet according to the present invention, the cylindrical lens may be provided on a glass substrate.

According to the present invention, since it is possible to cope with the highly accurate alignment of the hard lens with the hard display panel, the present invention can be used for the lenticular lens sheet having patterns of a resin prepared on one surface of the glass substrate.

According to another aspect of the present invention, there is provided a display apparatus, including: a display panel; and the lenticular lens sheet according to the present invention, which is attached to the display panel. The display apparatus according to the present invention may further include a protection film which is attached to an upper surface of the lenticular lens sheet.

According to another aspect of the present invention, there is provided an electronic equipment, including: the display apparatus according to the present invention.

The alignment mark on the lenticular lens sheet of the present invention can be recognized by a simple image recognition device in a short time with high accuracy. Accordingly, when bonding the lenticular lens sheet on the display panel, by using the two or more alignment marks provided on the lenticular lens sheet, the X and Y directions, as well as θ rotation can be aligned in a short time with high accuracy, thereby improving productivity.

Furthermore, since the alignment mark of the present invention can be stably processed without increasing costs, the alignment mark is read during aligning at a high speed with high accuracy.

Furthermore, according to the present invention, since the flat part is formed on only a region requiring the alignment mark, and the other regions are the lens, an area that can be set in the display area is not greatly reduced. In particular, this effect is significantly large in the lenticular lens sheet of the oblique lens, and the present invention may also be applied to the lenticular lens sheet of the oblique lens.

Furthermore, according to the present invention, since the leakage path is formed even when the protection film is bonded by reducing the height of the structure, the protection film is not swollen or peeled off even under a reduced pressure. Accordingly, since the bonding process of the lenticular lens sheet to the display panel is performed while the protection film is bonded to the lenticular lens sheet, it is possible to prevent the lens from being scratched or stained in this process, and thereby improving the yield.

Furthermore, since the present invention may also be applied to the lenticular lens sheet having patterns of a resin prepared on one surface of the glass substrate, it is possible to supply a stereoscopic display apparatus which has almost no dependency on a temperature such that stereoscopic display can be performed even when the temperature of the display apparatus is increased.

The above and further objects and features of the invention will be more fully apparent from the following detailed description with accompanying drawings.

DETAILED DESCRIPTION

Hereinafter, embodiments of the present invention will be described in detail with reference to the accompanying drawings.

First Embodiment

Figure 1:
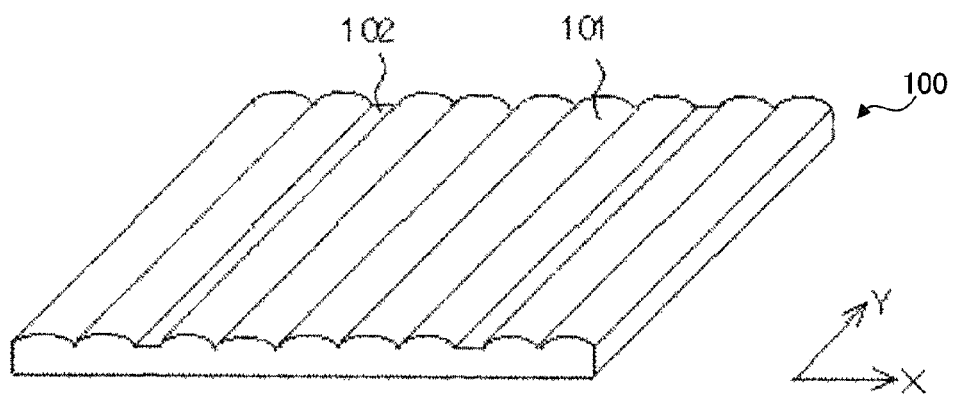
FIG. 1 is a perspective view illustrating a lenticular lens sheet of Patent Document 1.
Figure 2:
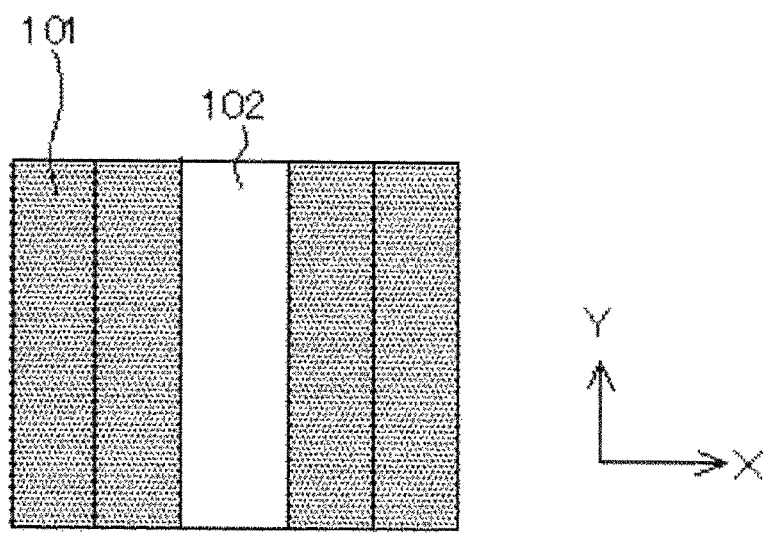
FIG. 2 is an enlarged front view illustrating an alignment mark on the lenticular lens sheet of Patent Document 1.
Figure 3:
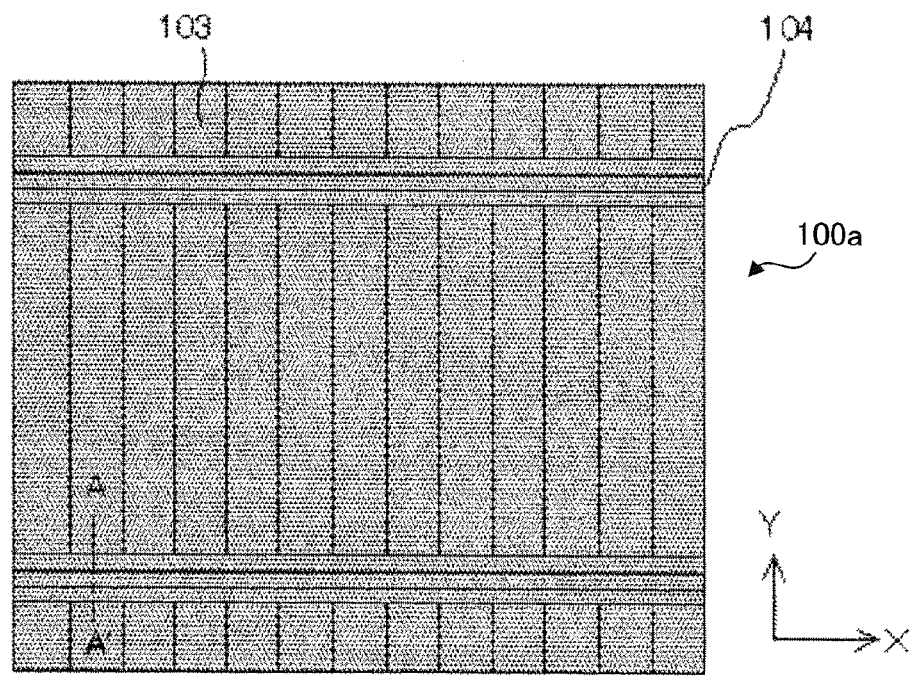
FIG. 3 is a front view illustrating a lenticular lens sheet in Method A of Patent Document 2.
Figure 4:
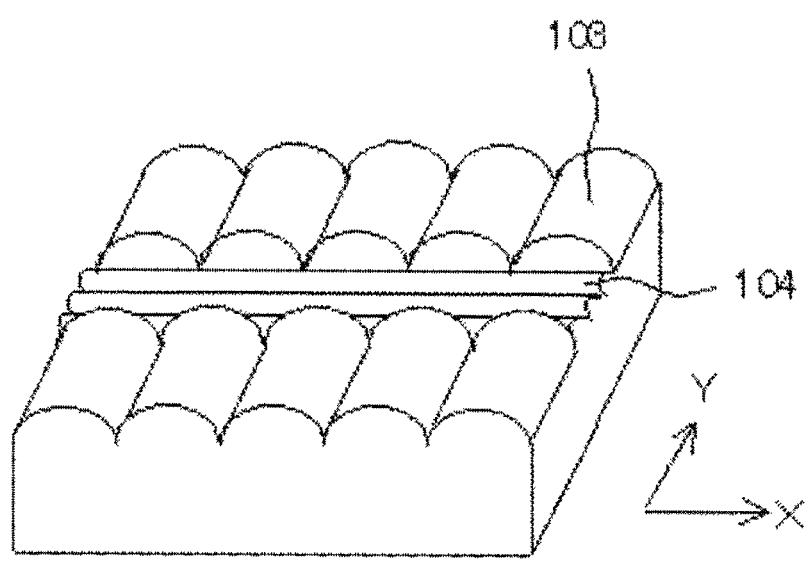
FIG. 4 is an enlarged perspective view illustrating an alignment mark of the lenticular lens sheet in Method A of Patent Document 2.
Figure 5:
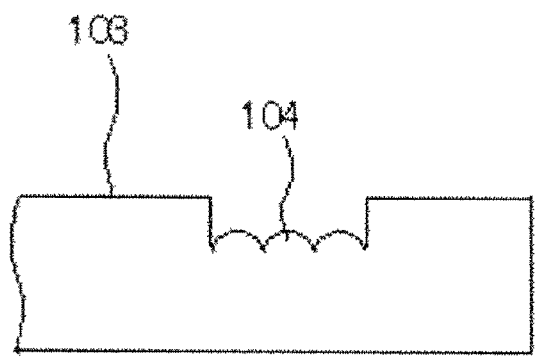
FIG. 5 is a cross-sectional view illustrating the lenticular lens sheet in Method A of Patent Document 2 taken on line A-A' illustrated in FIG. 3.
Figure 6:
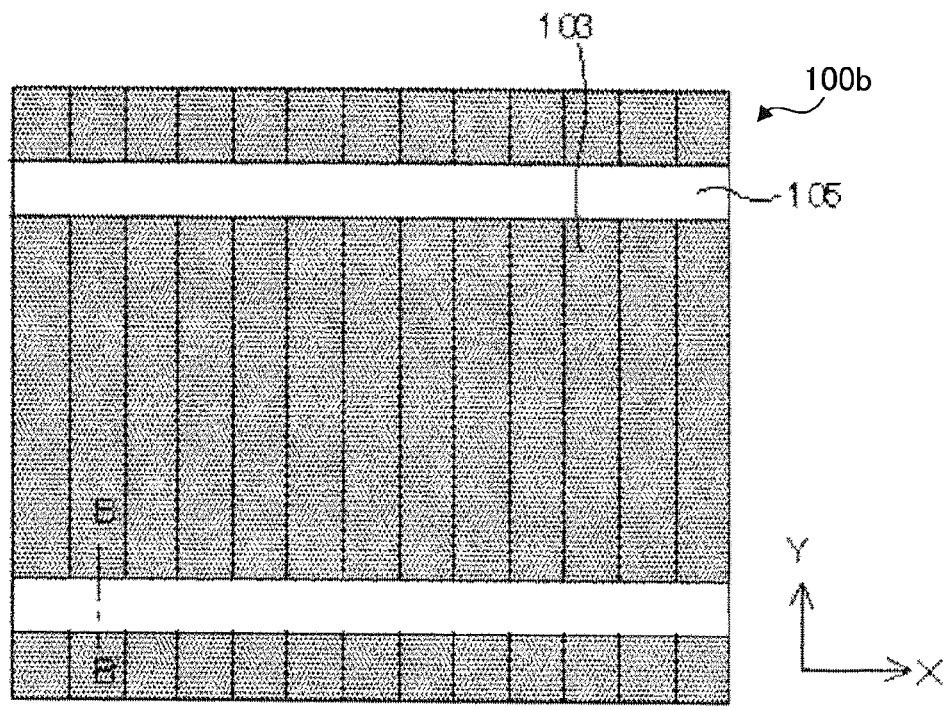
FIG. 6 is a front view illustrating the lenticular lens sheet in Method B of Patent Document 2.
Figure 7:
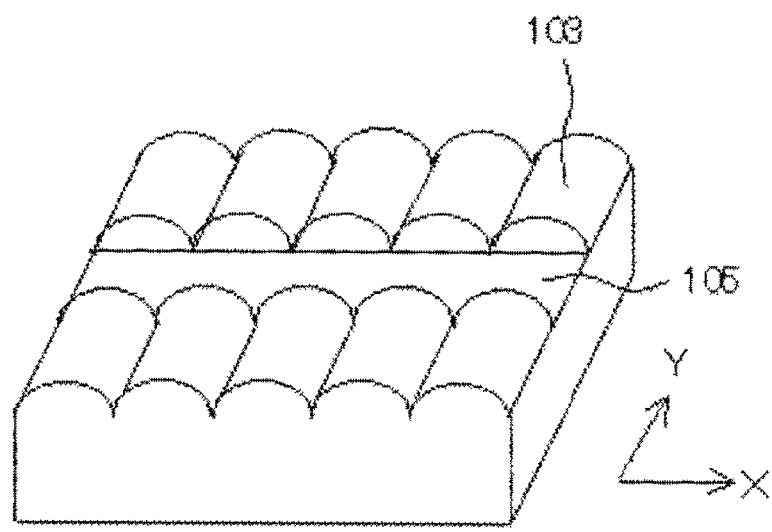
FIG. 7 is an enlarged perspective view illustrating the alignment mark of the lenticular lens sheet in Method B of Patent Document 2.
Figure 8:
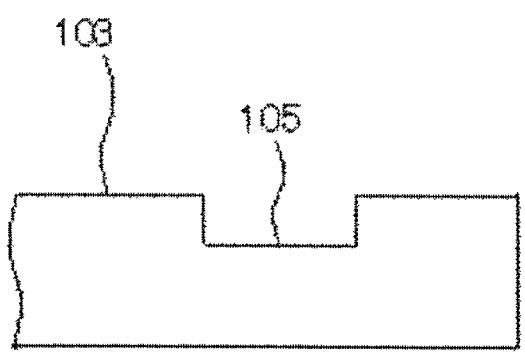
FIG. 8 is a cross-sectional view illustrating the lenticular lens sheet in Method B of Patent Document 2 taken on line B-B' illustrated in FIG. 6.
Figure 9:
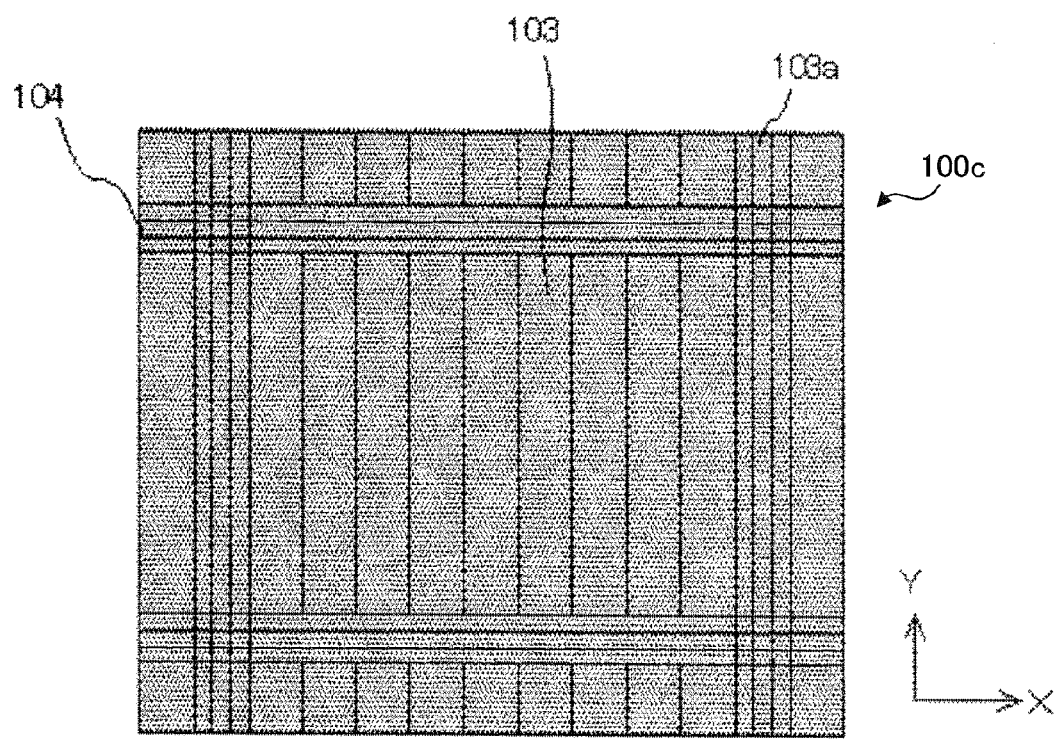
FIG. 9 is a front view illustrating the lenticular lens sheet in Method C of Patent Document 2.
Figure 10:
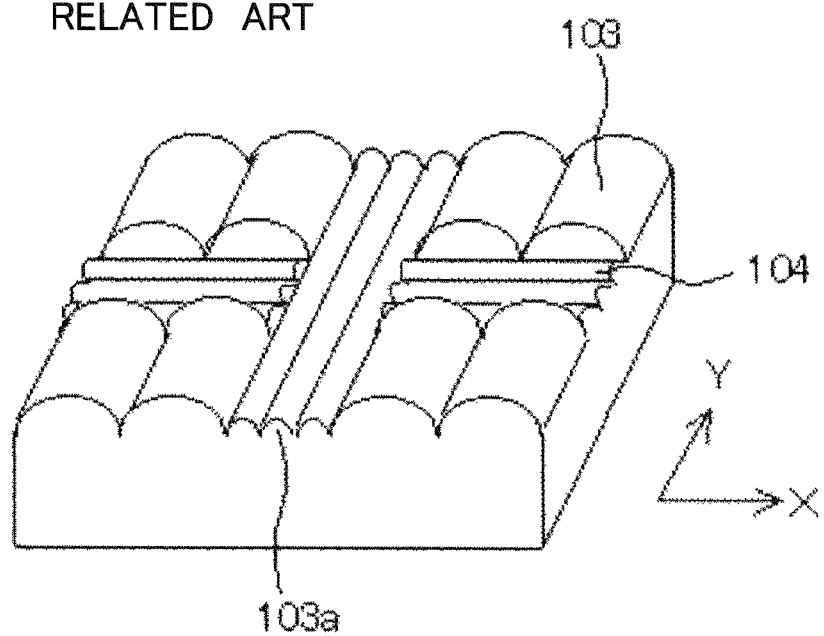
FIG. 10 is an enlarged perspective view illustrating the alignment mark of the lenticular lens sheet in Method C of Patent Document 2.
Figure 11:
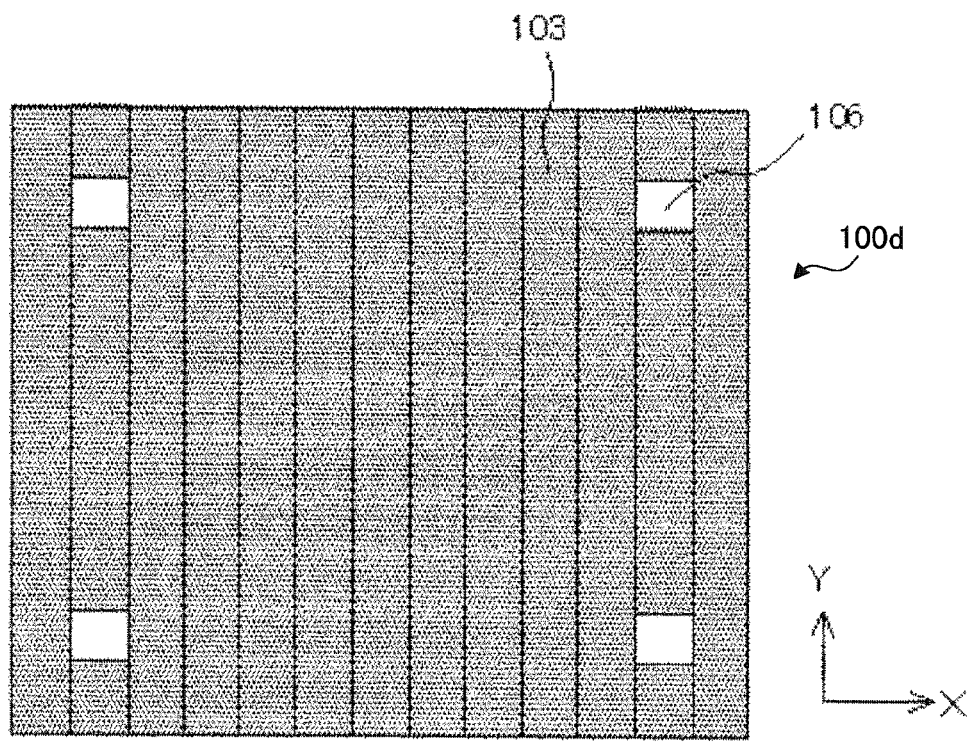
FIG. 11 is a front view illustrating a lenticular lens sheet of Patent Document 3.
Figure 12:
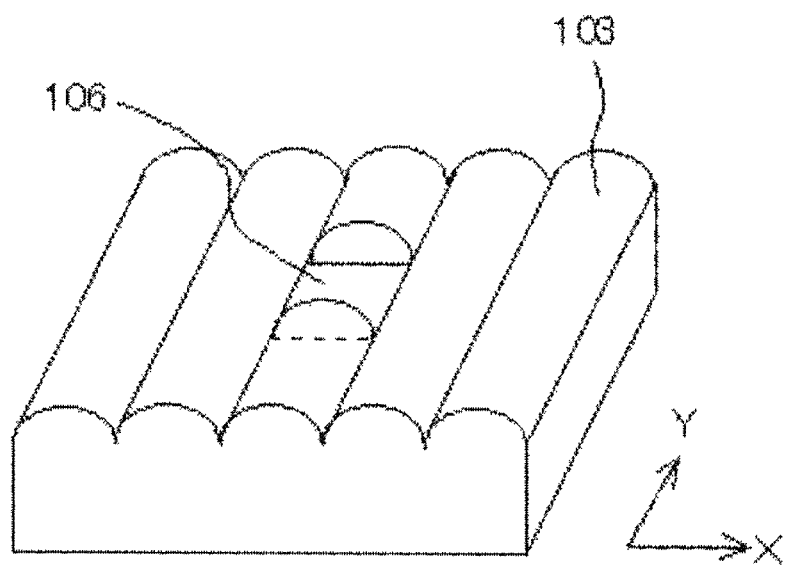
FIG. 12 is an enlarged perspective view illustrating an alignment mark on the lenticular lens sheet of Patent Document 3.
Figure 13:
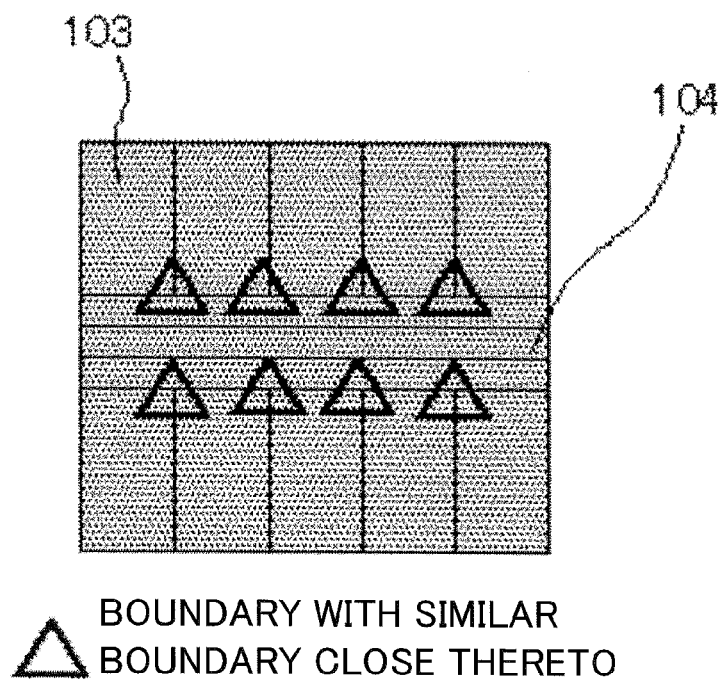
FIG. 13 is an enlarged front view illustrating the alignment mark of the lenticular lens sheet in Method A of Patent Document 2.
Figure 14:
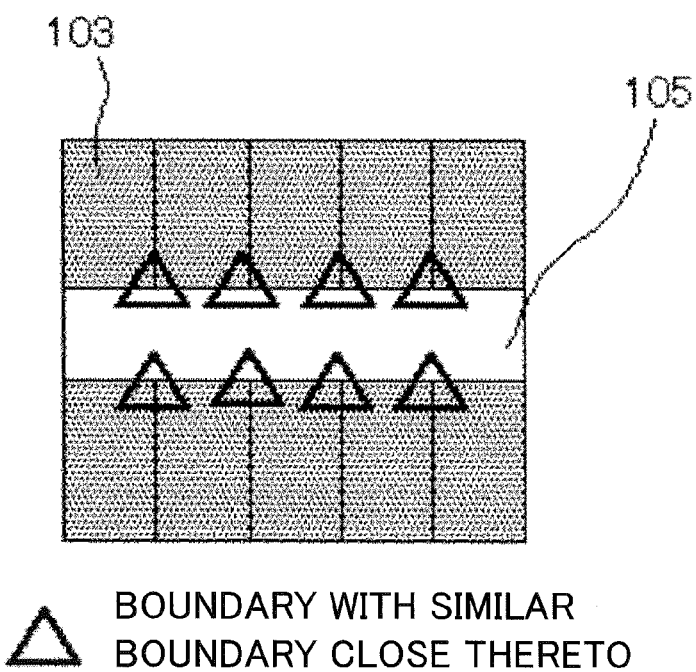
FIG. 14 is an enlarged front view illustrating the alignment mark of the lenticular lens sheet in Method B of Patent Document 2.
Figure 15:
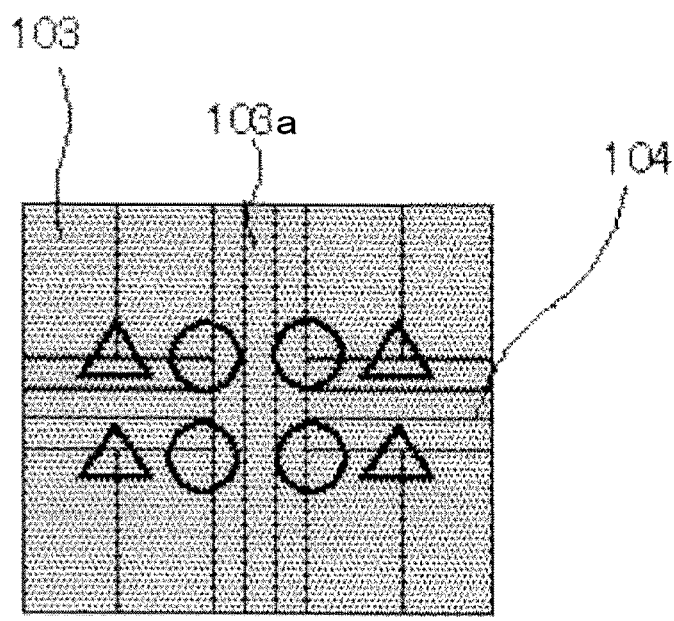
FIG. 15 is an enlarged front view illustrating the alignment mark of the lenticular lens sheet in Method C of Patent Document 2.
Figure 15:
Figure 15:
Figure 16:
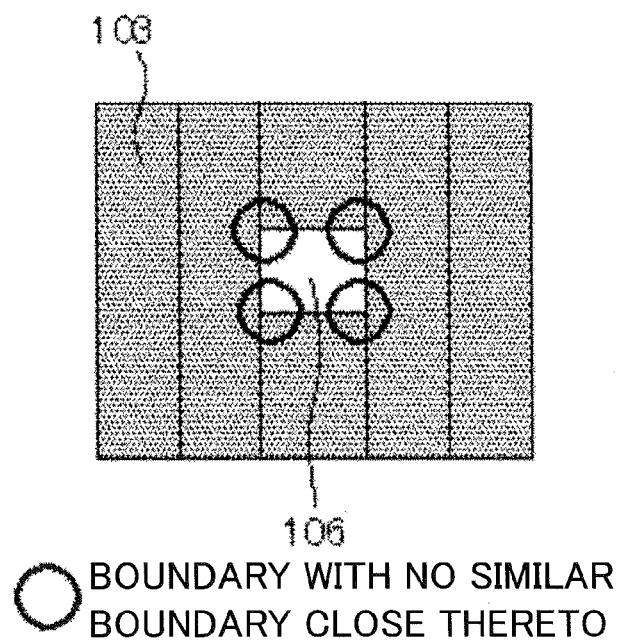
FIG. 16 is an enlarged front view illustrating the alignment mark on the lenticular lens sheet of Patent Document 3.
Figure 17:
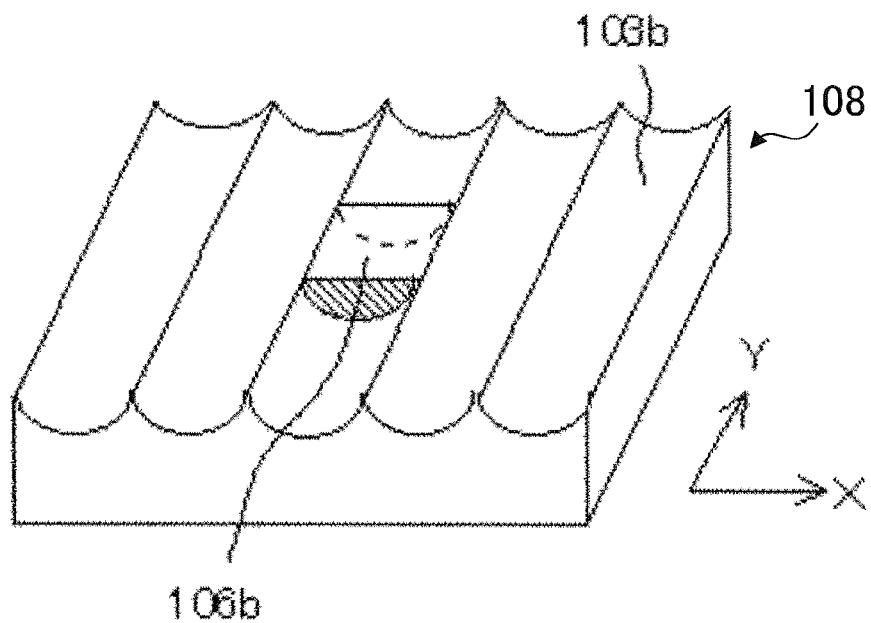
FIG. 17 is a perspective view illustrating a mold (mold having an ideal shape but difficult to process at a low cost) used for preparing the lenticular lens sheet of Patent Document 3.
Figure 18:
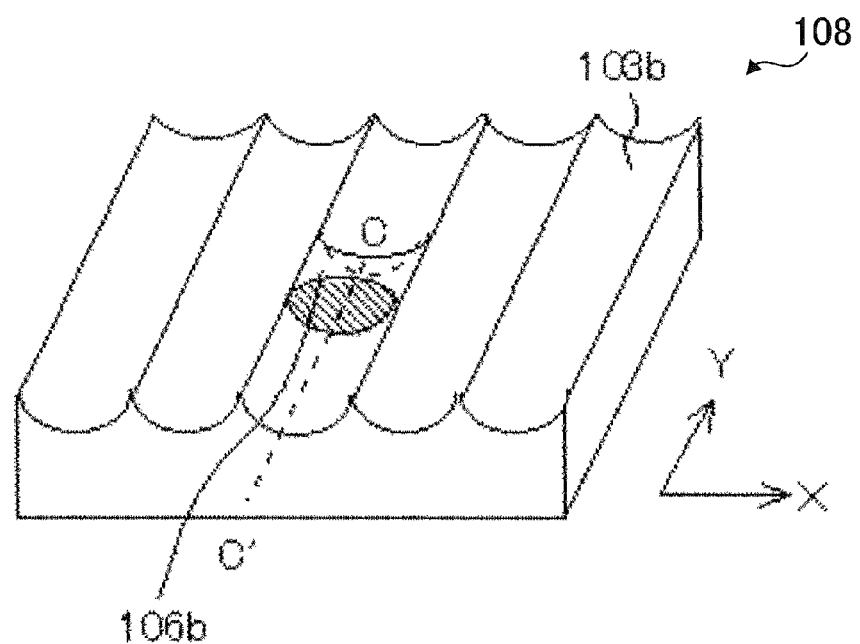
FIG. 18 is a perspective view illustrating a mold (mold having a practical shape capable of being processed at a low cost) used for preparing the lenticular lens sheet of Patent Document 3.
Figure 19:
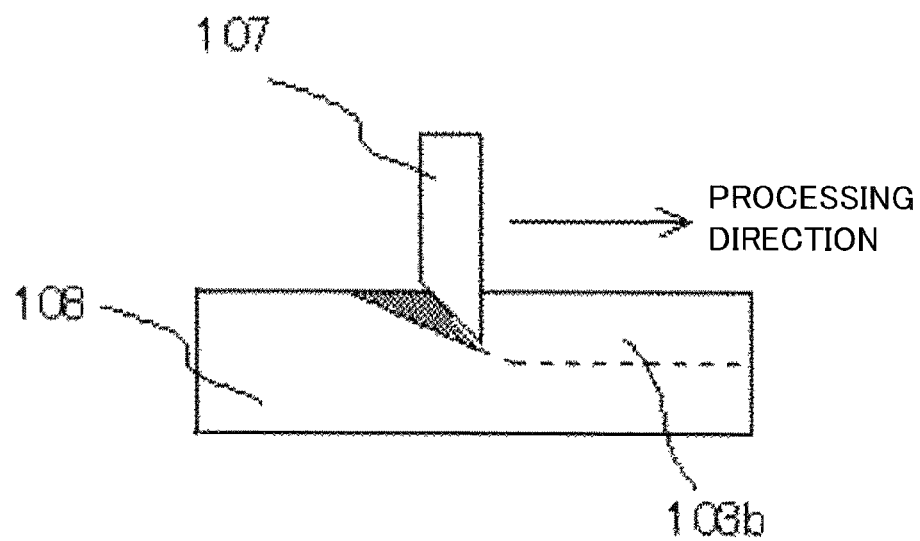
FIG. 19 is a cross-sectional view illustrating a fabrication process of the mold taken on line C-C' of FIG. 18.
Figure 20:
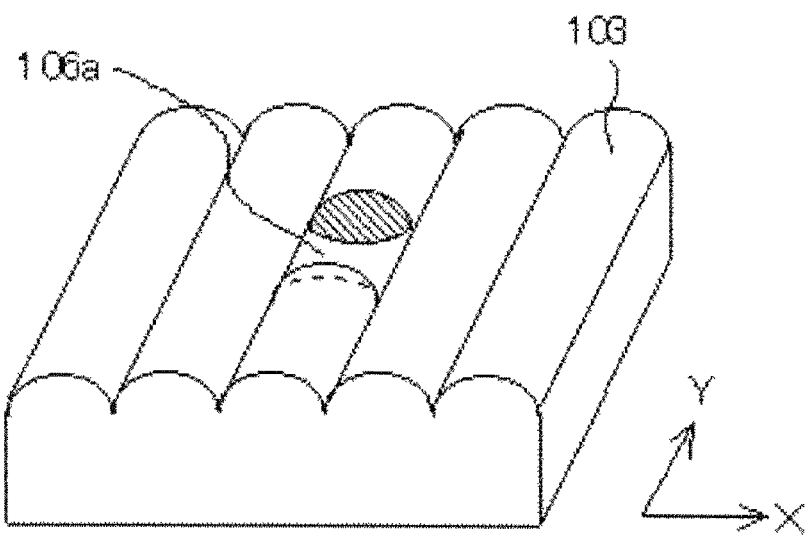
FIG. 20 is a perspective view illustrating the lenticular lens sheet prepared by the mold having a practical shape capable of being processed at a low cost of FIG. 18 based on Patent Document 3.
Figure 21:
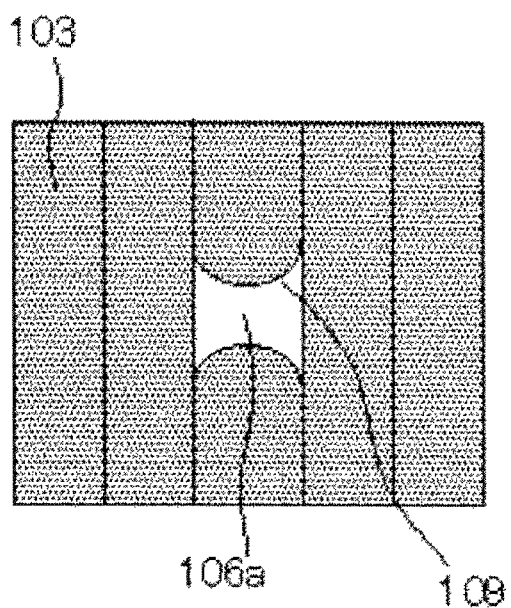
FIG. 21 is a front view illustrating the lenticular lens sheet of FIG. 20.
Figure 22:
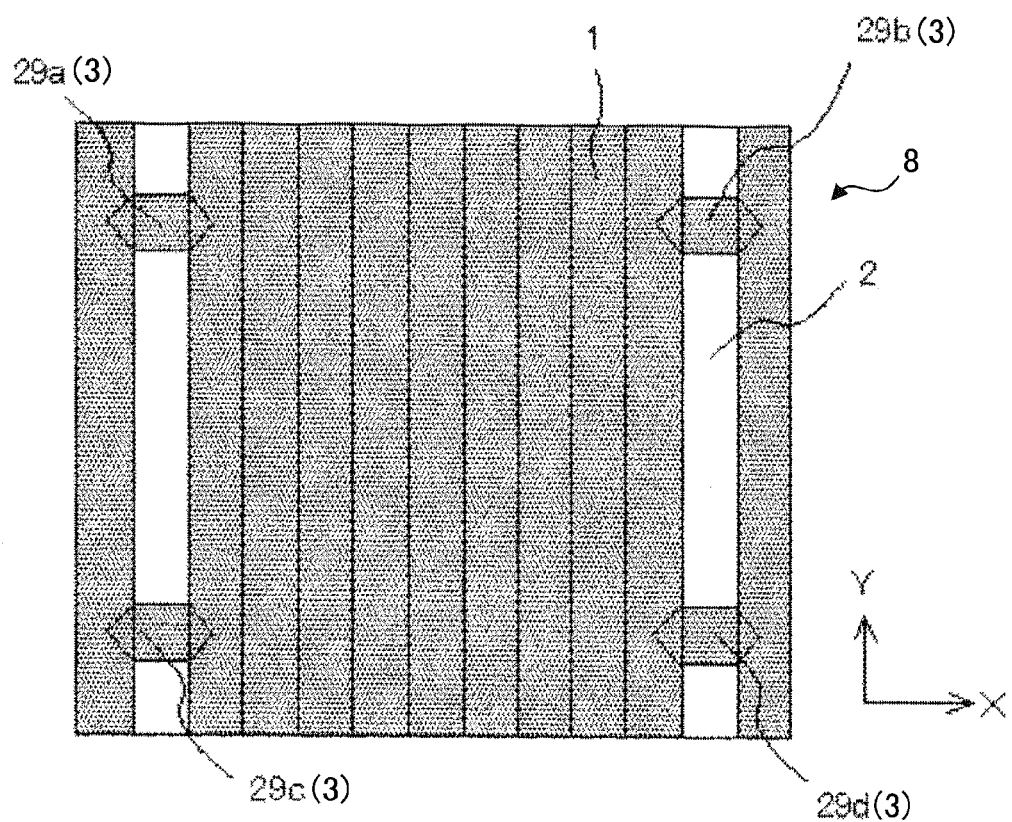
FIG. 22 is a front view illustrating a lenticular lens sheet of a first embodiment.
Figure 23A:
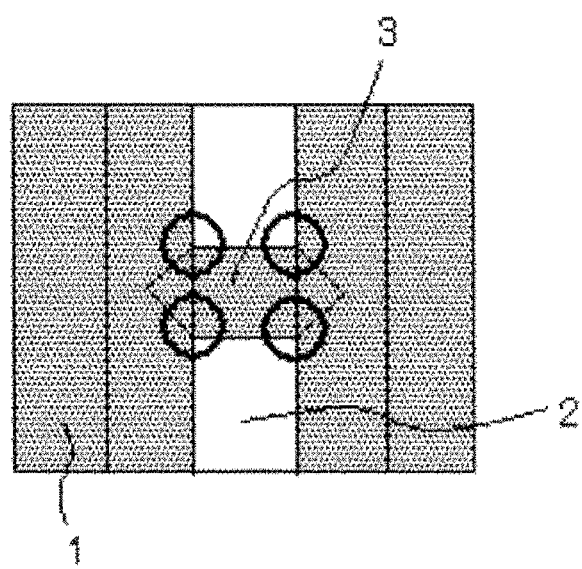
FIG. 23A is an enlarged front view illustrating an alignment mark on the lenticular lens sheet of the first embodiment.
Figure 23B:
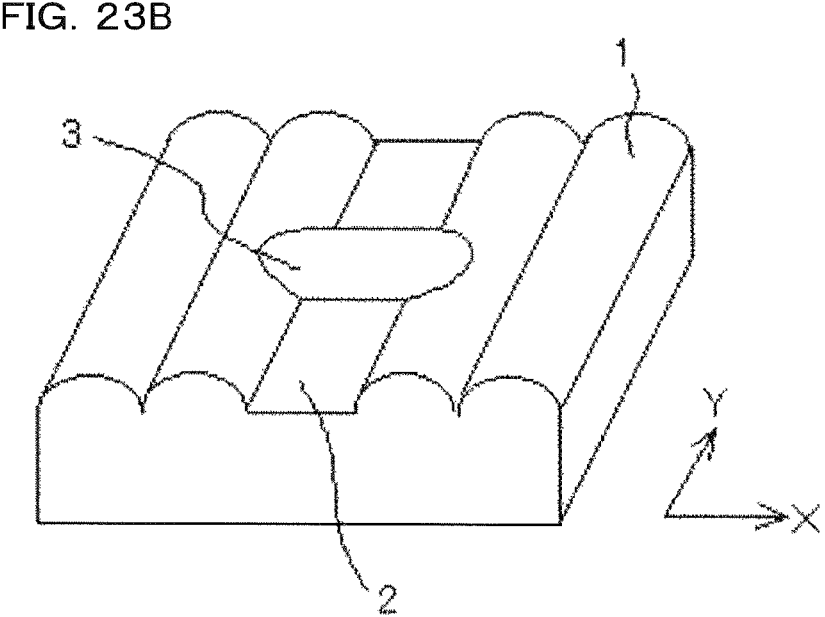
FIG. 23B is an enlarged perspective view illustrating the alignment mark on the lenticular lens sheet of the first embodiment.

First, a first embodiment of the present invention will be described in detail with reference to the accompanying drawings. FIG. 22 is a front view illustrating a lenticular lens sheet 8 of a first embodiment. In addition, FIGS. 23A and 23B illustrate alignment marks of the lenticular lens sheet 8 of the first embodiment, wherein FIG. 23A is an enlarged front view, and FIG. 23B is an enlarged perspective view. Dot hatching regions of FIGS. 22 and 23A represent portions having the surface formed in a curved surface.

In the first embodiment, as illustrated in FIG. 22, the lenticular lens sheet 8 having a plurality of Y-direction cylindrical lenses 1 substantially parallel to each other in the Y direction has alignment marks 29a to 29d including two Y-direction cylindrical lenses 1 among the plurality of Y-direction cylindrical lenses, flat parts 2 disposed between the two Y-direction cylindrical lenses 1, and structures 3 which are provided on the flat parts 2 and extend between the two Y-direction cylindrical lenses 1 (i.e., connect the two Y-direction cylindrical lenses 1). In FIGS. 22, 23A and 23B, the structures 3 are X-direction cylindrical lenses substantially parallel to each other in an X-direction.

As illustrated in FIG. 23B, in the first embodiment, the surfaces of the Y-direction cylindrical lens 1 and the structure 3 are curved surfaces. Accordingly, when observing an alignment mark of the lenticular lens sheet 8 by a CCD camera using epi-illumination light, the Y-direction cylindrical lens 1 and the structure 3 are seen at the same brightness and color as each other, but the flat part 2 is seen at brightness and color enough to be recognized. Therefore, the boundaries between the Y-direction cylindrical lens 1 and the flat part 2, and between the structure 3 and the flat part 2 can be recognized by a simple image recognition device in a short time with high accuracy. For example, results of experiments by the inventors, when the Y-direction cylindrical lens 1 and the structure 3 having RGB values of 100, 100 and 93, the flat part 2 had RGB values of 152, 153 and 145. Herein, the respective RGB values range from 0 to 255. In a CCD camera observation using the transmitted light and the epi-illumination light, since the flat part, and a line of intersection between the flat part and the curved surface are present on the same focus position, and focusing can be performed using both thereof, it is easy to perform the focusing. Further, in the CCD camera observation using the transmitted light and the epi-illumination light, the boundaries between the Y-direction cylindrical lens 1 and the flat part 2, and between the structure 3 and the flat part 2 have no boundary (similar boundary) having the same shape as each other close thereto, thereby only a boundary region aimed at can be recognized by a simple image recognition device in a short time with high accuracy.

In addition, when the coordinates of two or more, preferably three or more alignment marks among the alignment marks 29a to 29d at four corners of the lenticular lens sheet 8 in FIG. 22 may be identified, high accurate alignment can be achieved.

Figure 24A:
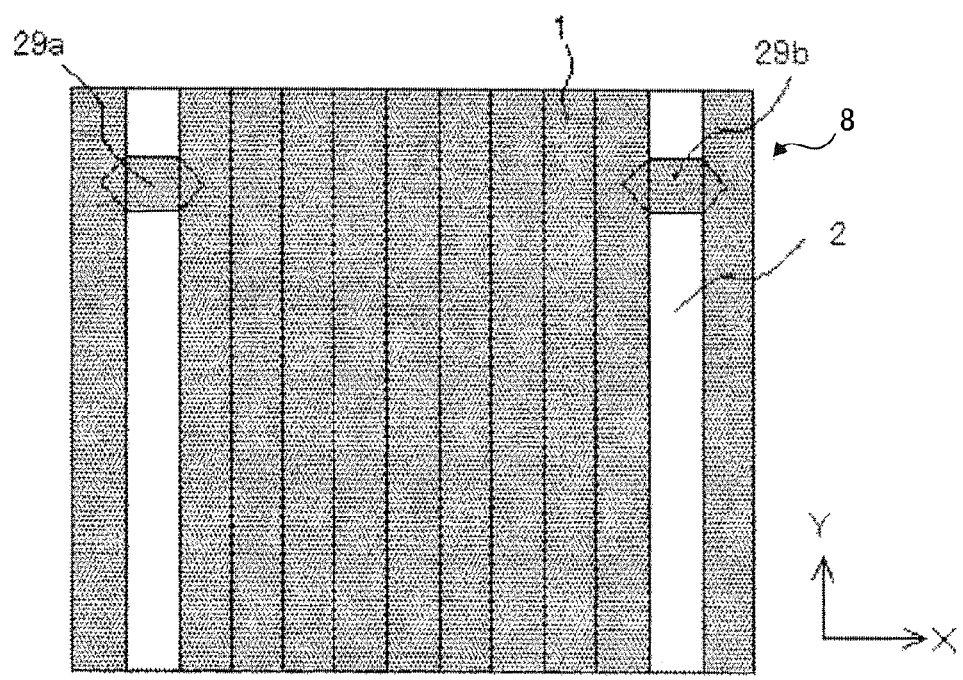
FIG. 24A is a front view illustrating another lenticular lens sheet of the first embodiment.
Figure 24B:
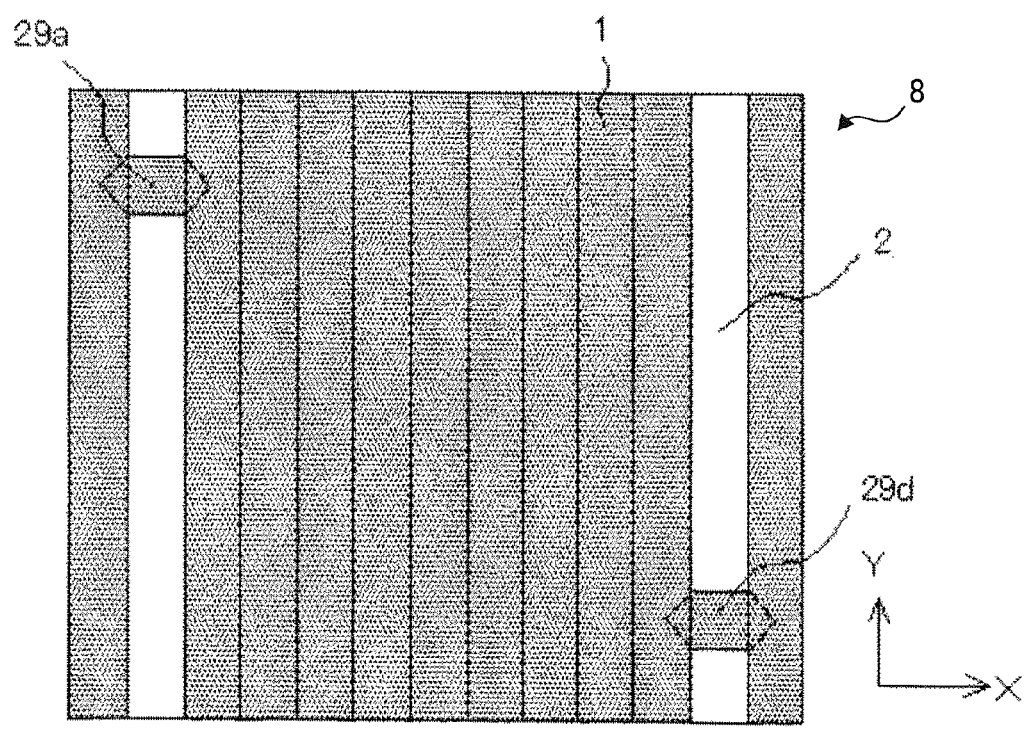
FIG. 24B is a front view illustrating another lenticular lens sheet of the first embodiment.

First, an example of using two alignment marks will be described. For example, as illustrated in FIG. 24A, the highly accurate alignment in X direction and the highly accurate alignment in Y direction can be achieved by coordinates of the alignment marks 29a and 29b. Similarly, the highly accurate alignment using the alignment marks 29c and 29d which are disposed at an interval in the X direction can be achieved. Also, a combination of the alignment marks 29a and 29d which are disposed at intervals in the X and Y directions (see FIG. 24B), or a combination of the alignment marks 29b and 29c also enable the highly accurate alignment. Further, preparation of the alignment mark which is not used for the alignment may be omitted, as illustrated in FIGS. 24A and 24B.

Figure 24C:
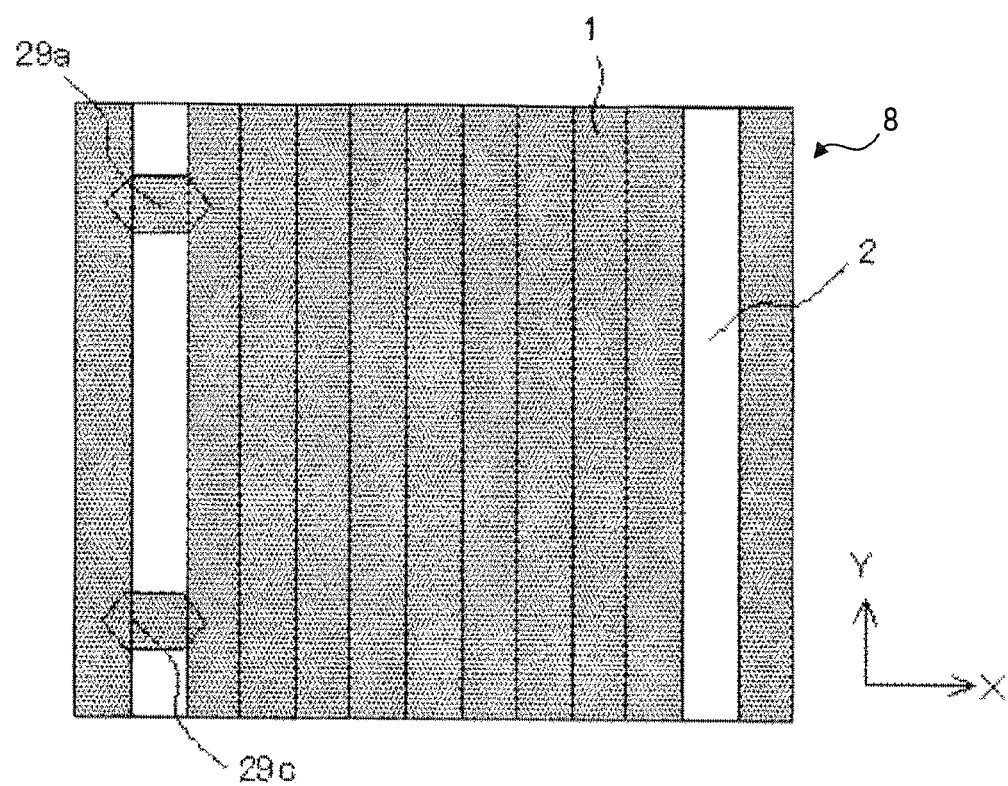
FIG. 24C is a front view illustrating another lenticular lens sheet of the first embodiment.

When the dimensions of the lenticular lens sheet 8 are made according to a design value, a combination of the alignment marks 29a and 29c which are disposed at an interval in the Y direction (see FIG. 24C), or a combination of the alignment marks 29b and 29d also enable the highly accurate alignment. However, since there is no means for correcting the misalignment in the X direction, when the dimensions of the lenticular lens sheet 8 in the X direction are contracted or expanded from the design value, the magnitude of a shift is different from each other depending on the location. For example, when the position in the X direction is aligned at the position of the alignment mark 29a without shift, the shift may be increased as separated from the position of the alignment mark 29a in the X direction. Meanwhile, in the combination of the alignment marks 29a and 29b (see FIG. 24A), even when the dimensions of the lenticular lens sheet 8 in the X direction are contracted or expended from the design value, it is possible to align so that the misalignment in the X direction at the alignment mark 29a and the misalignment in the X direction at the alignment mark 29b are minimized.

In the example using four alignment marks (29a, 29b, 29c and 29d) (FIG. 22), even when the dimensions of the lenticular lens sheet 8 are contracted and expanded not only in the X direction but also in the Y direction, it is possible to align so that misalignments in the X and Y directions at the positions of the four alignment marks are minimized. Therefore, when using the four alignment marks, it is possible to align with high accuracy, regardless of the dimensional accuracy of the lenticular lens sheet. In the case of aligning using three alignment marks, alignment accuracy may be decreased compared to the case of using the four alignment marks, but it is possible to align with a higher accuracy than the case of using the two alignment marks.

Figure 24D:
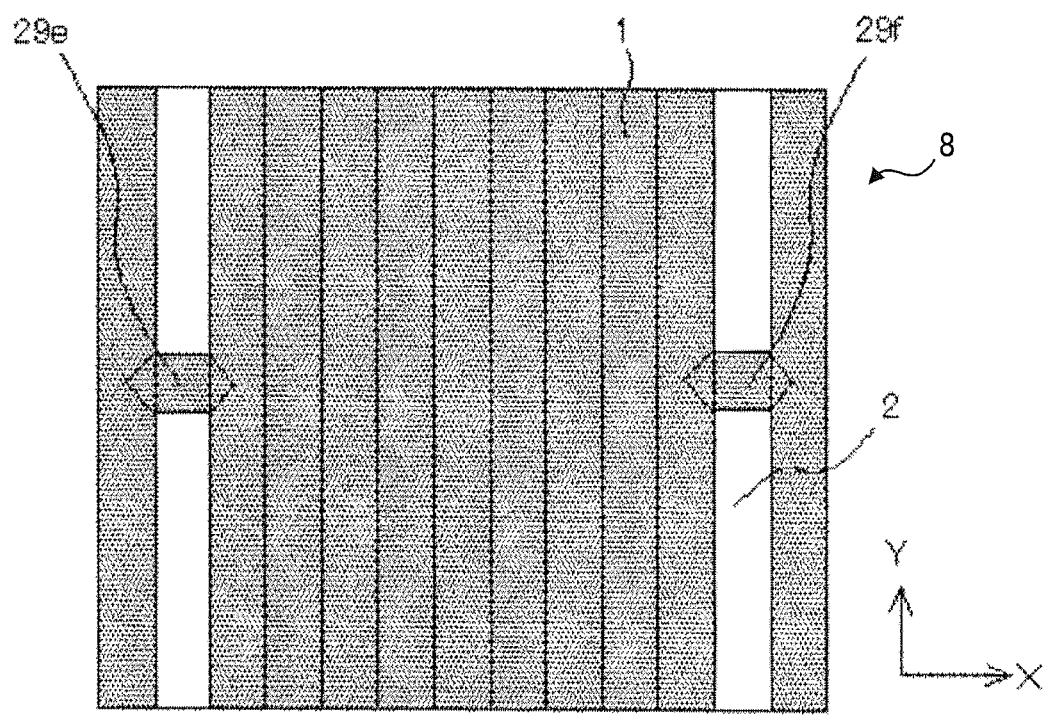
FIG. 24D is a front view illustrating another lenticular lens sheet of the first embodiment.

At the time of identifying the coordinates of the alignment marks, the coordinate of at least one boundary among four boundaries surrounded by a circle in FIG. 23A may be established per one alignment mark. In addition, when aligning using the two alignment marks, instead of the alignment marks at four corners, alignment marks 29e and 29f, which are disposed in the center of the flat part 2 in the Y direction as illustrated in FIG. 24D, may be used.

By using the alignment mark on the lenticular lens sheet 8 of the first embodiment, in a method of fixing the lenticular lens sheet on a stage, it is possible to be bonded to the display panel by aligning with high accuracy. In particular, when observing the alignment mark by the CCD camera using the epi-illumination light, even when using an opaque material such as stainless steel for the stage, unlike the CCD camera observation using the transmitted light, there is no need to make a hole for lighting in the stage, such that the alignment mark can be easily observed. Meanwhile, when observing using the transmitted light, if the size of the lenticular lens sheet is changed, it is necessary to align the holes for lighting formed in the stage, and there may be a case of requiring replacement of the stage. In this case, the replacement of the stage takes time due to the attachment accuracy being important, and this becomes a factor of decreasing productivity. However, when observing the alignment mark by the CCD camera using the epi-illumination light, such problems may not occur.

Figure 25A:
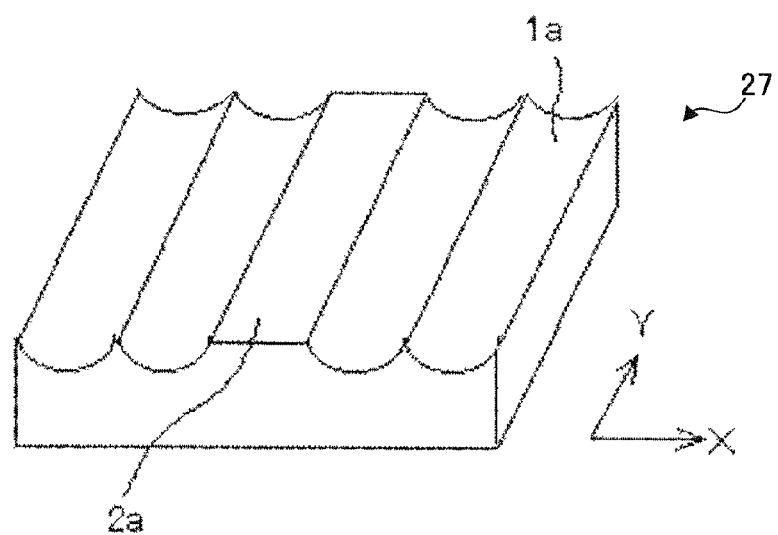
FIG. 25A is a perspective view illustrating a method of manufacturing a mold required to prepare the lenticular lens sheet of the first embodiment.
Figure 25B:
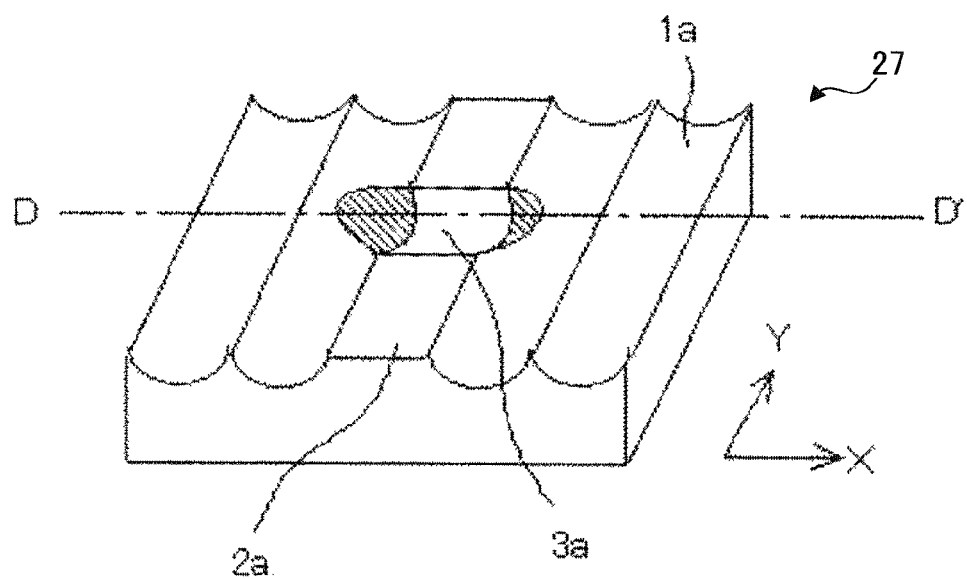
FIG. 25B is a perspective view illustrating a method of manufacturing the mold required to prepare the lenticular lens sheet of the first embodiment.

The lenticular lens sheet 8 of the first embodiment may be manufactured, for example, by transferring the shape of a mold 27 illustrated in FIGS. 25A and 25B to a resin. A method of manufacturing the mold 27 will be described using FIGS. 25A and 25B. As illustrated in FIG. 25A, leaving a flat-part forming part 2a, cylindrical lens forming parts 1a are formed in the mold 27. Then, as illustrated in FIG. 25B, a structure forming part 3a is formed from one cylindrical lens forming part 1a to the other cylindrical lens forming part 1a which face to each other with the flat-part forming part 2a interposed therebetween by penetrating the flat-part forming part 2a. Further, for clarity of the processed shape, slant-hatchings are added to the cut portions of the cylindrical lens forming part 1a in FIG. 25B.

Figure 26:
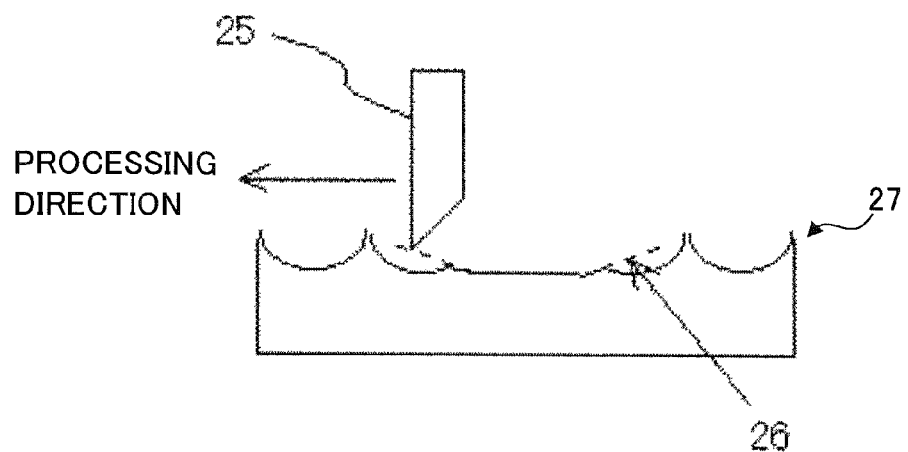
FIG. 26 is a cross-sectional view illustrating the mold taken on line D-D' of FIG. 25B.

FIG. 26 illustrates a cross-sectional view taken on line D-D' of FIG. 25B. As illustrated in FIG. 26, the area of the flat-part forming part 2a may be processed without the ascending and descending processes of a tool bit 25, thereby the processed shape is stabilized. The processing accompanying the ascending and descending processes of the tool bit 25 which may cause an unstable processed shape, that is, the movement of the tool bit 25 up and down is performed in the area of the cylindrical lens forming part 1a, such that the shapes of the boundaries between the Y-direction cylindrical lens 1 and the flat part 2, and between the structure 3 and the flat part 2 are not affected. That is, since the mold required for preparing the lenticular lens sheet of the first embodiment does not need a special processing, the fabrication cost of the mold 27 is not substantially changed, compared to the case of not making the structure 3. Further, a trajectory 26 of a cutting edge of the tool bit 25 is illustrated in FIG. 26.

In addition, the processing is performed in the area of the flat-part forming part 2a while not ascending and descending the tool bit 25, the structure 3 intersects the flat part 2 in two straight lines, and the two straight lines are parallel to each other.

Figure 27A:
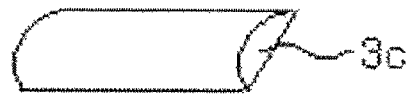
FIG. 27A is perspective views illustrating a structure of the lenticular lens sheet of the first embodiment.
Figure 27B:
FIG. 27B is perspective views illustrating a structure of the lenticular lens sheet of the first embodiment.
Figure 27C:
FIG. 27C is perspective views illustrating a structure of the lenticular lens sheet of the first embodiment.

As the structure 3, in addition to the cylindrical lens 3c as illustrated in FIG. 27A, a hexahedron 3d as illustrated in FIG. 27B, a prism 3e as illustrated in FIG. 27C, or the like may be used. In the case of the hexahedron 3d, sides in contact with the flat part 2 are formed in an inclined surface having a taper. The surfaces of the prism 3e are formed in an inclined surface. Accordingly, when observing by the CCD camera using the epi-illumination light, since the inclined surfaces of the flat part 2 and the structure 3 have different brightness and color enough to be recognized from each other, the boundaries between the Y-direction cylindrical lens 1 and the flat part 2, and between the structure 3 and the flat part 2 can be recognized by a simple image recognition device in a short time with high accuracy.

In the first embodiment of the present invention, in order to simplify the description, the lenticular lens sheet 8 including the Y-direction cylindrical lens 1 is exemplified, but the lenticular lens sheet including the X-direction cylindrical lens may also be employed. In this case, the structure 3 may be a cylindrical lens extending in the Y direction, the hexahedron, the prism or the like.

Figure 28:
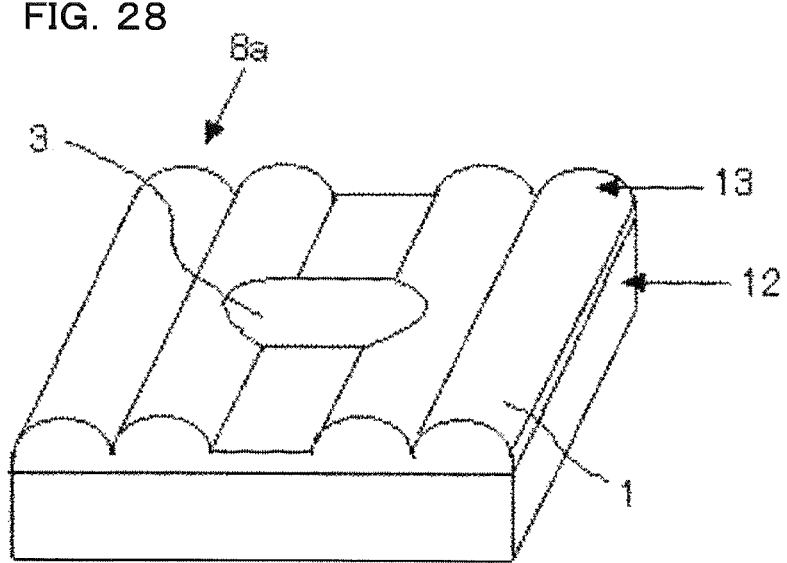
FIG. 28 is an enlarged perspective view illustrating an alignment mark of another lenticular lens sheet of the first embodiment.

Moreover, the lenticular lens sheet 8 of the first embodiment is formed in an integral type in which the Y-direction cylindrical lenses 1, the structures 3 and the sheet are made of the same material as each other as illustrated in FIG. 24, but the lenticular lens sheet 8a may be formed by disposing the Y-direction cylindrical lens 1 made of a resin 13 and the structure 3 on the substrate such as a glass substrate 12 as illustrated in FIG. 28.

A method of manufacturing the lenticular lens sheet 8a illustrated in FIG. 28 will be described. First, a resin 13 is applied on the glass substrate 12 in an appropriate amount. Then, a pre-processed shape of the mold 27 is transferred to the applied resin 13. When using an ultraviolet curable resin, the resin 13 is cured by irradiating with ultraviolet rays. Thereafter, the mold 27 is removed, and the cured resin is cut into a predetermined size to complete the lenticular lens sheet 8a.

Figure 29:
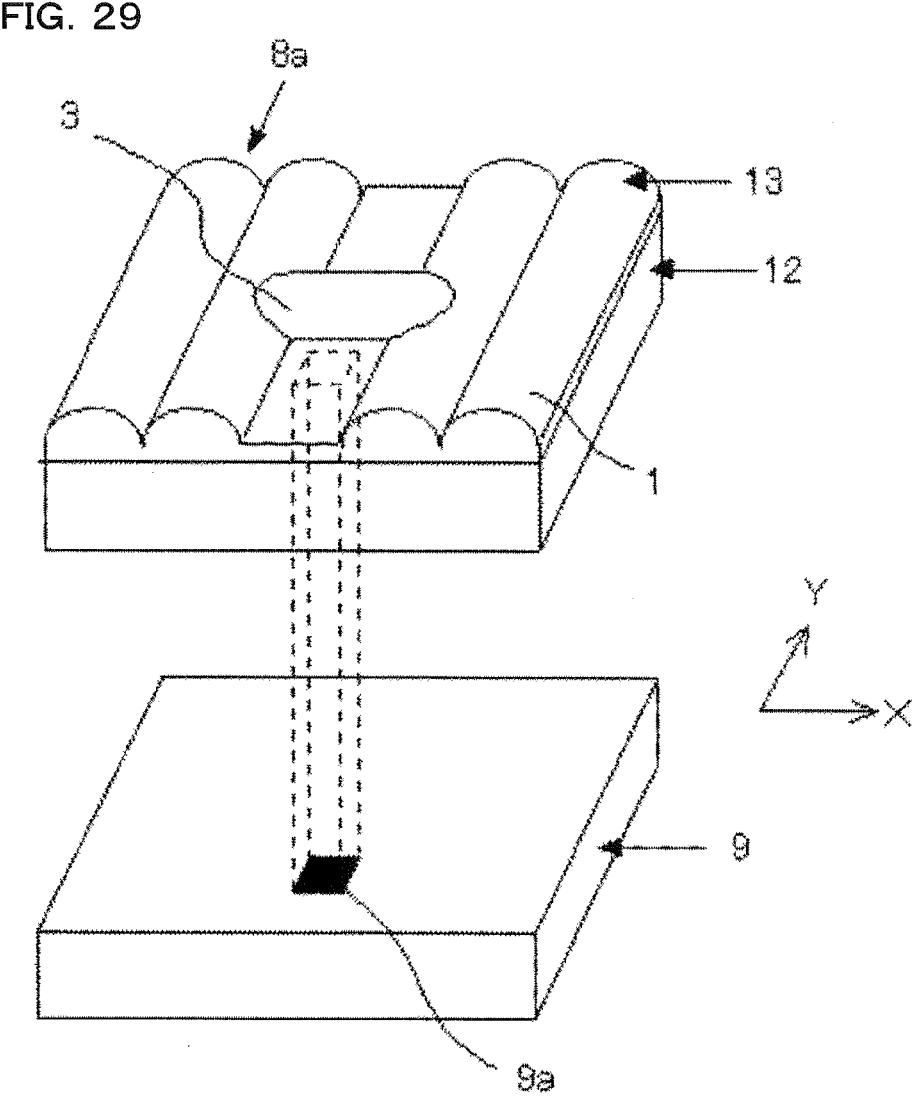
FIG. 29 is a perspective view illustrating another alignment method of the lenticular lens sheet with a display panel.

In addition, as illustrated in FIG. 29, the shape of the alignment mark on the lenticular lens sheet 8a of the first embodiment and the shape of the alignment mark 9a on a display panel 9 are simultaneously observed by the CCD camera to align the same with high accuracy, such that the lenticular lens sheet 8a may be bonded to the display panel 9. In FIG. 29, the lenticular lens sheet 8a in which the cylindrical lens is prepared of the resin 13 on the glass substrate 12 of FIG. 28 is described as an example, but it may be applied to the integral lenticular lens sheet 8 as illustrated in FIG. 24.

Second Embodiment

Figure 30:
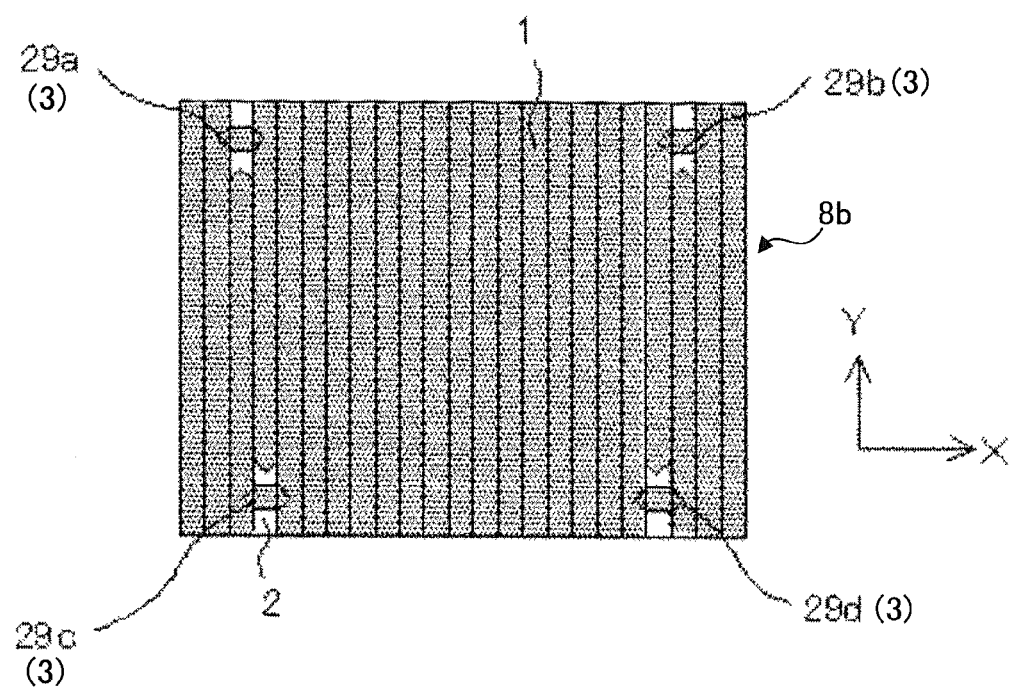
FIG. 30 is a front view illustrating a lenticular lens sheet of a second embodiment.

In the first embodiment, as illustrated in FIG. 22, only the structures 3 forming the alignment marks are present in the direction parallel to the extending direction of the Y-direction cylindrical lenses 1 of the flat parts 2. The second embodiment is different from the first embodiment in that, as illustrated in FIG. 30, the structure 3 and the Y-direction cylindrical lenses 1 forming the alignment marks are present in a direction parallel to the extending direction of the Y-direction cylindrical lenses 1 of the flat parts 2, in other words, the flat parts 2 are present only near the structures 3. Except this difference, the second embodiment can obtain the same effects as the first embodiment.

In the second embodiment, similar to the first embodiment, two or more, and preferably, three or more alignment marks among the alignment marks at four corners of the lenticular lens sheet are prepared, thereby the high accurate alignment can be achieved. FIG. 30 illustrates an example in which the alignment marks are prepared at the four corners of the lenticular lens sheet 8*b*.

Figure 31:
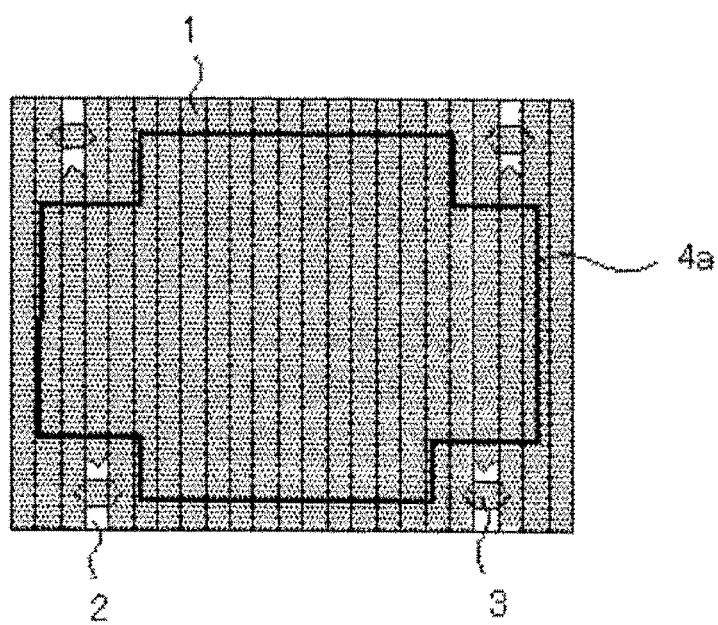
FIG. 31 is a view in which an area that can be set in a display area is added to the front view illustrating the lenticular lens sheet of FIG. 30.

FIG. 30 illustrates an example in which the alignment mark 29*a* and alignment mark 29*c* are provided on the extending direction of the Y-direction cylindrical lenses 1 adjacent to each other, but the alignment mark 29*a* and the alignment mark 29*c* may be provided on the extending direction of the Y-direction cylindrical lenses 1 further separated from each other. In these cases, one alignment mark is provided on the extension of the same flat part 2. Alternately, the alignment mark 29*a* and the alignment mark 29*c* may be provided on the extending direction of the same Y-direction cylindrical lens 1. In all the cases, by comparing the practical coordinates of the alignment marks with the design coordinates of the alignment marks, high accurate alignment can be achieved. By the configuration of the second embodiment, it is possible to reduce the flat part 2 which does not contribute to the stereoscopic image display, such that, as compared to the first embodiment, as illustrated in FIG. 31, an area 4*a* that can be set in a display area may be expanded.

Figure 32:
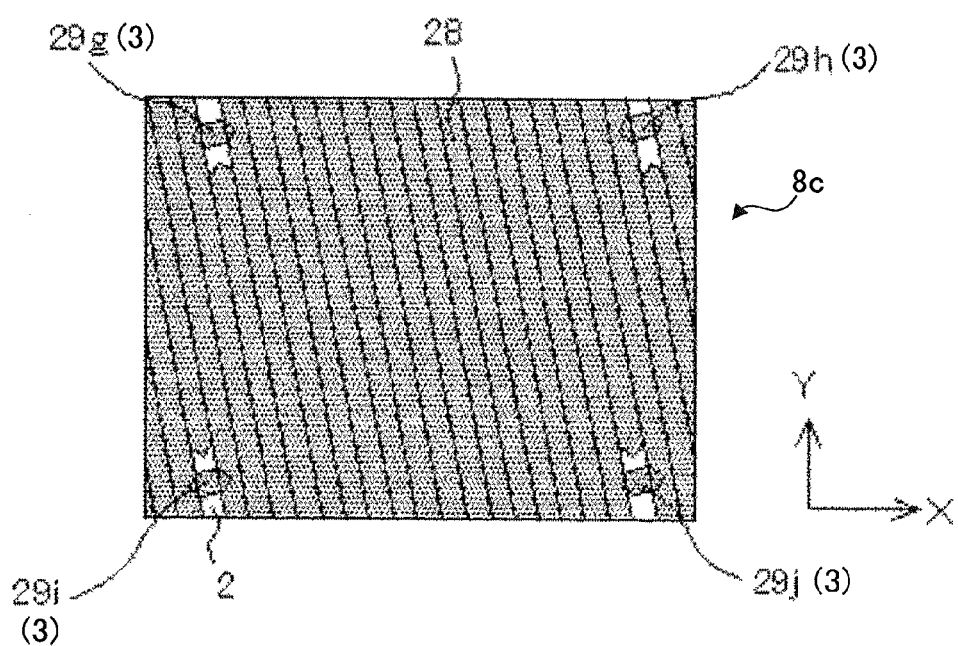
FIG. 32 is a front view illustrating the lenticular lens sheet of an oblique lens of the second embodiment.
Figure 33A:
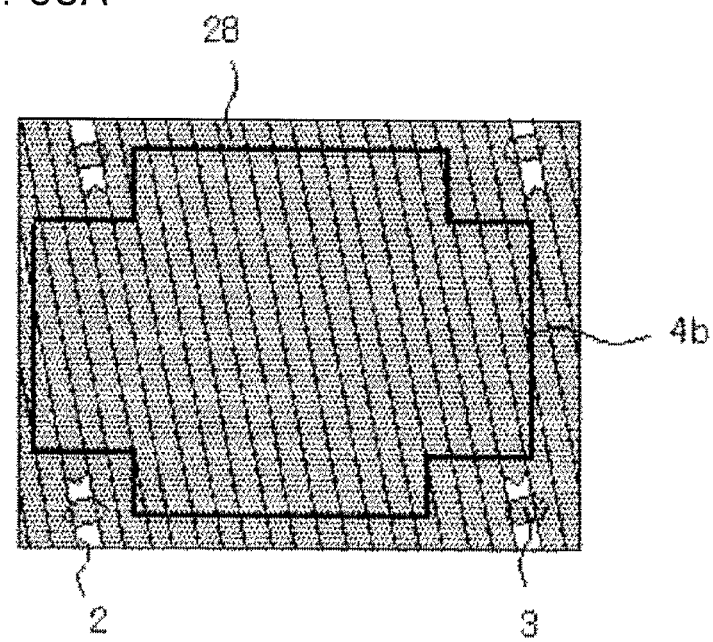
FIG. 33A is a view in which the area that can be set in the display area is added to the front view illustrating the oblique lenticular lens sheet.

In addition, in the second embodiment, as illustrated in FIG. 32, the present invention may also be applied to a lenticular lens sheet 8*c* including oblique cylindrical lenses 28 whose extending direction is inclined from a Y-axis direction. In this case, the structures 3 and the oblique cylindrical lenses 28 forming the alignment marks are present in a direction parallel to the extending direction of the oblique cylindrical lenses 28 of the flat part 2. That is, except the flat parts 2 required for the alignment marks, by making as the oblique cylindrical lenses 28, as illustrated in FIG. 33A, an area 4*b* that can be set in the display area may be expanded.

Figure 34:
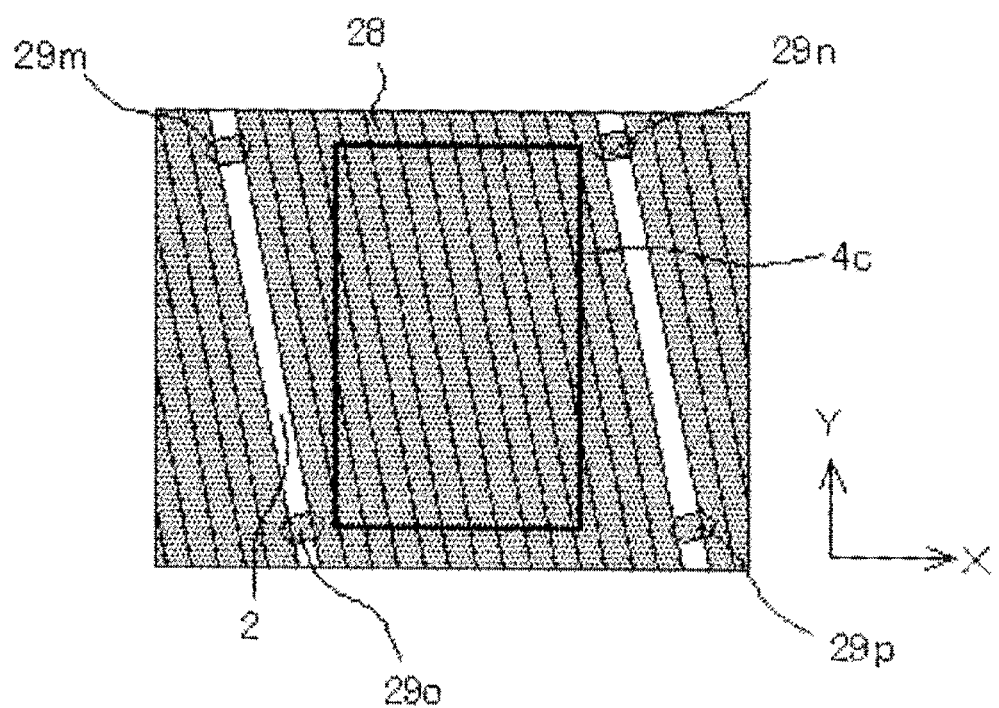
FIG. 34 is a front view illustrating the lenticular lens sheet using an oblique cylindrical lens applied with the configuration of the first embodiment.

The oblique cylindrical lenses 28 have, as illustrated in FIG. 32, an extending direction inclined with respect to sides forming an external form of the lenticular lens sheet 8*c*. Herein, the inclined state means that the lenses are not parallel or perpendicular to the sides. In FIG. 32, the extending direction of the cylindrical lenses is inclined with respect to the four sides forming the external form, and the alignment marks 29*g* and 29*i* (29*h* and 29*j*) are provided on the extending direction of the oblique cylindrical lenses 28 separated from each other, such that the alignment marks 29*g* and 29*i* (29*h* and 29*j*) may be disposed at the corners of the lenticular lens sheet 8*c*. FIG. 34, illustrates a lenticular lens sheet using the oblique cylindrical lenses 28 to which the configuration of the first embodiment is applied. In this case, the alignment marks 29*n* and 29*o* among four alignment marks 29*m*, 29*n*, 29*o* and 29*p* are disposed at positions which are not the corners of the lenticular lens sheet, such that the area represented by 4*c* becomes an area that can be set in the display area, which is significantly smaller than the area 4*b* illustrated in FIG. 33A of the second embodiment.

Figure 35A:
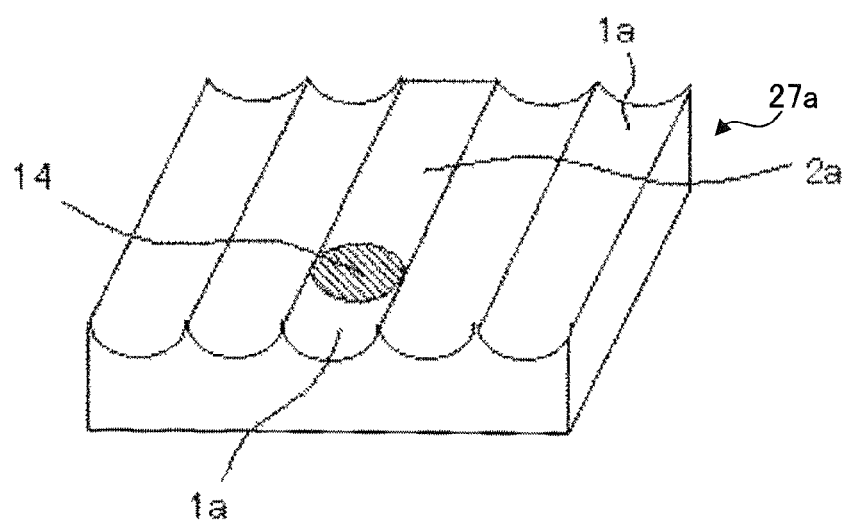
FIG. 35A is a perspective view illustrating a method of manufacturing a mold required to prepare the lenticular lens sheet of the second embodiment.
Figure 35B:
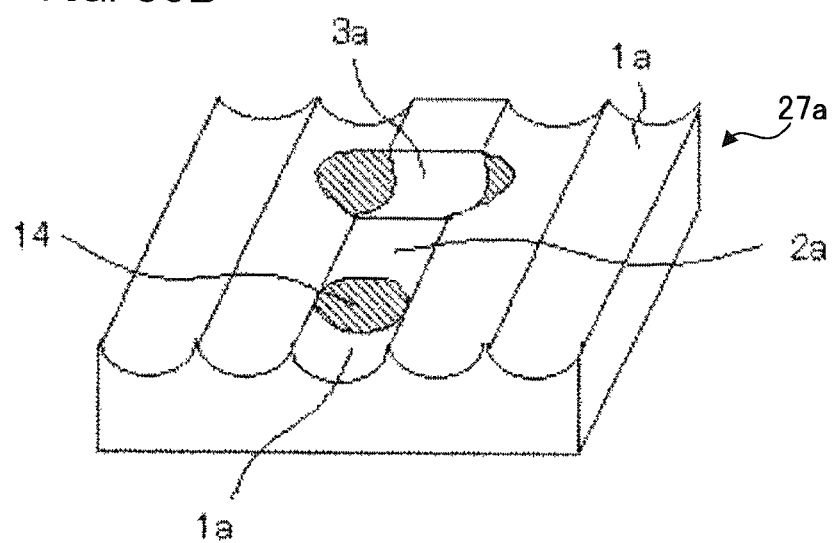
FIG. 35B is a perspective view illustrating a method of manufacturing the mold required to prepare the lenticular lens sheet of the second embodiment.

The lenticular lens sheet of the second embodiment may be manufactured, for example, by transferring the shape of a mold 27*a* as illustrated in FIGS. 35A and 35B to a resin. A method of manufacturing the mold 27*a* will be described using FIGS. 35A and 35B. As illustrated in FIG. 35A, leaving a flat-part forming part 2*a*, a cylindrical lens forming part 1*a* is formed in the mold 27*a*. In this case, by changing the tool bit from a descended state (cutting state) to an ascended state (non-cutting state) with respect to the extending direction of the lens, the flat-part forming part 2*a* may be formed. This point is largely different from the case of FIG. 25A of the first embodiment.

Further, in the formation of the flat-part forming part 2*a*, because the tool bit is gradually ascended (pulled out) as a processing considering a tool bit load, as illustrated in FIG. 35A, a pull-out trace 14 (slant-hatching portion in FIG. 35A) occurs. The mold is also processed by beginning of the cutting of the cylindrical lens forming part 1*a* while the tool bit is gradually descended, thereby a trace having a shape similar to the pull-out trace may be formed.

Next, in FIG. 35B, as similar to FIG. 25B, a structure forming part 3*a* is formed by making the tool bit in the descended state from one cylindrical lens forming part 1*a* to the other cylindrical lens forming part 1*a* which face to each other with the flat-part forming part 2*a* interposed therebetween by penetrating the flat-part forming part 2*a*. Further, for clarity of the processed shape, slant-hatchings are added to the cut portions of the cylindrical lens forming part 1*a* in FIG. 35B. In addition, the structure 3 may use the cylindrical lens extending in the Y direction, the hexahedron, the prism or the like. When the pull-out trace 14 of the tool bit and the alignment mark are separated from each other at some distance, the boundaries between the Y-direction cylindrical lens 1 and the flat part 2, and between the structure 3 and the flat part 2 can be recognized by a simple image recognition device in a short time with high accuracy.

Figure 33B:
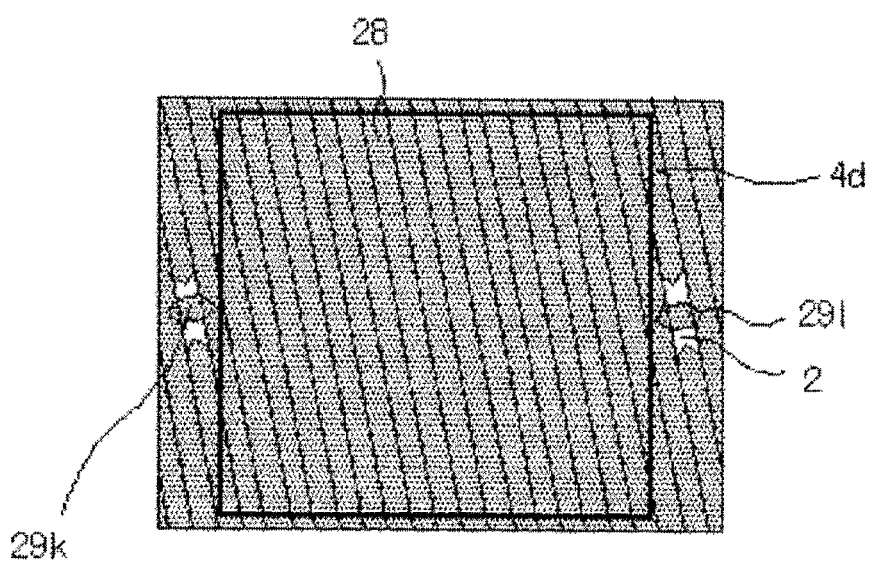
FIG. 33B is a view in which the area that can be set in the display area is added to the front view illustrating the oblique lenticular lens sheet.

FIG. 33B illustrates another oblique cylindrical lens of the second embodiment. As illustrated in FIG. 33B, except the flat parts 2 required for the alignment marks 29*k* and 29*l*, it is possible to make both sides of the flat parts 2 in the extending direction thereof as the oblique cylindrical lenses 28. In addition, similar to the case of the Y-direction cylindrical lenses 1 as illustrated in FIG. 30, except the flat parts 2 required for the alignment marks, it is possible to make the both sides of the flat parts 2 in the extending direction thereof as the Y-direction cylindrical lenses 1.

Third Embodiment

The third embodiment, which will be described below, may be applied to the first and second embodiments, but, in particular, the case of being applied to the first embodiment with a large effect will be described. In the third embodiment, the structure 3 will be described as an example of the X-direction cylindrical lens, but the hexahedron, the prism, or the like may also be applied thereto.

In FIG. 23B, the height of the structure 3 is defined by setting the flat part 2 (or the lower flat surface of the cylindrical lens) as a reference surface. Similarly, the height of the Y-direction cylindrical lens 1 is also defined by setting the flat part 2 (or the lower flat surface of the cylindrical lens) as the reference surface. In the first embodiment, as illustrated in FIG. 23B, the height of the structure 3 and the height of the Y-direction cylindrical lens 1 are substantially the same as each other, but in the third embodiment, the height of the structure 3 is configured to be shorter than the height of the Y-direction cylindrical lens 1. Except this difference, the third embodiment uses the same structure as the first and second embodiments.

Figure 36:
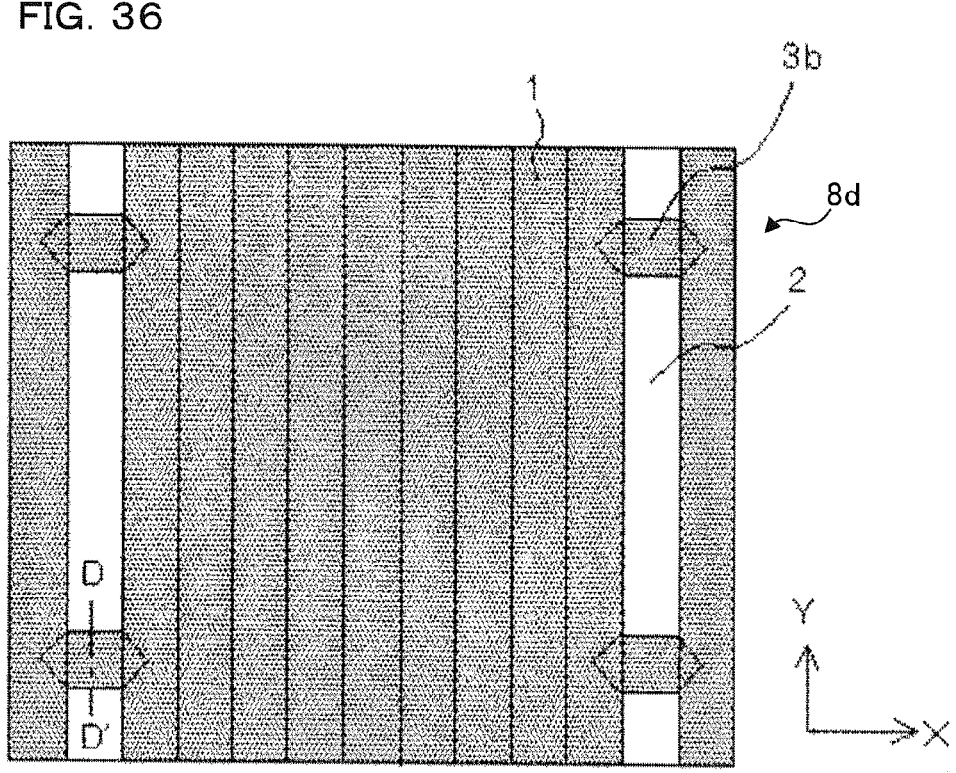
FIG. 36 is a front view illustrating a lenticular lens sheet of a third embodiment.
Figure 37:
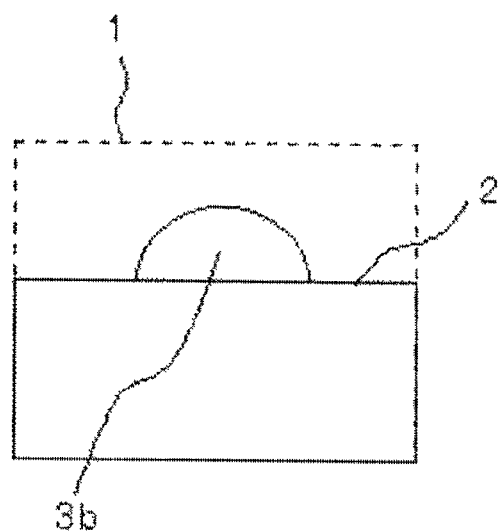
FIG. 37 is a cross-sectional view illustrating the lenticular lens sheet of the third embodiment taken on line of D-D' illustrated in FIG. 36.

FIG. 36 is a front view illustrating a lenticular lens sheet 8d of the third embodiment. FIG. 37 is a cross-sectional view taken on line D-D' of FIG. 36. The structure of the third embodiment is suitable in the case of performing the bonding process of the lenticular lens sheet with the display panel under a reduced pressure, while the protection film is bonded to the lens surface side of the lenticular lens sheet 8d, which will be described in detail below. Further, the protection film serves to prevent damage to the lens, or adhering of foreign matter.

Figure 38:
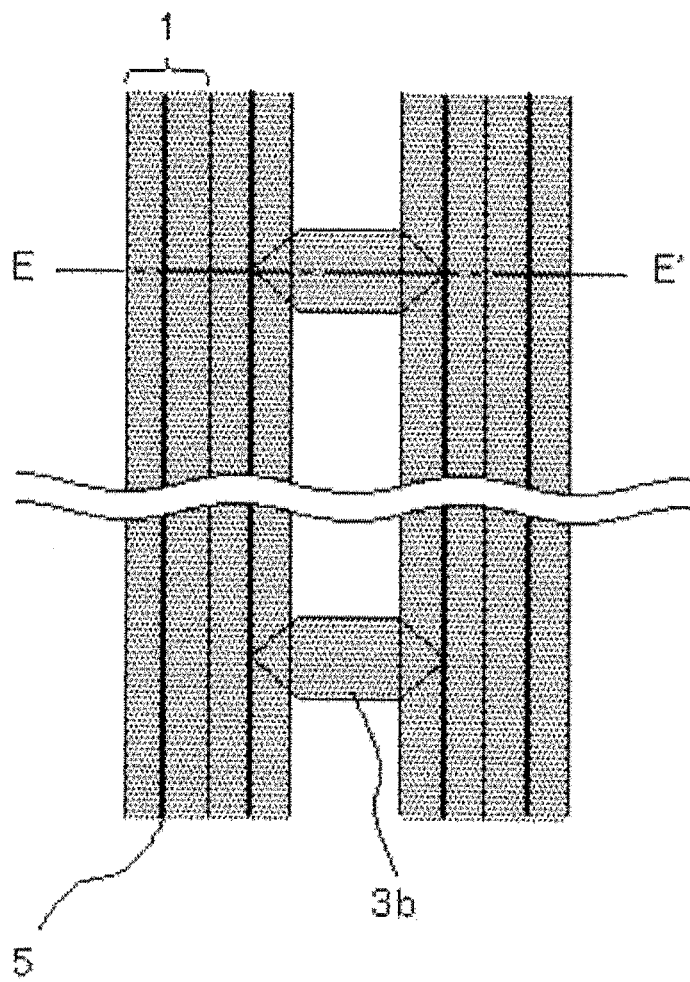
FIG. 38 is an enlarged front view illustrating the alignment mark on the lenticular lens sheet of the third embodiment.
Figure 39:
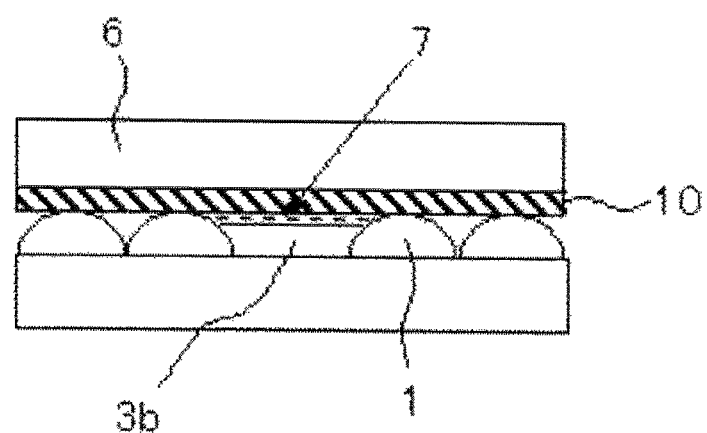
FIG. 39 is a cross-sectional view illustrating the lenticular lens sheet of the third embodiment after a protection film sheet is bonded to the lenticular lens sheet taken on line E-E' illustrated in FIG. 38.

FIG. 38 is an enlarged front view illustrating the alignment mark of the third embodiment. In addition to the front view illustrating FIG. 36, FIG. 38 illustrates a contact part 5 of the protection film with the lens. When the protection film is bonded to the lens surface of the lenticular lens sheet, an adhesive of the protection film is firmly adhered to high regions of the Y-direction cylindrical lens 1. Meanwhile, by making the height of the structure 3b to a level which does not allow the adhesive of the protection film to be firmly adhered thereto, the protection film and the structure 3b are not in directly contact with each other. FIG. 39 is a cross-sectional view taken on line E-E' of FIG. 38, after a protection film 6 is bonded to the lenticular lens sheet 8d. The structure 3b is not firmly adhered to an adhesive 10 of the protection film 6, such that a leakage path 7 may be formed on the structure 3b. This leakage path 7 is favorably operated in the bonding process of the lenticular lens sheet with the display panel under a reduced pressure.

Figure 40:
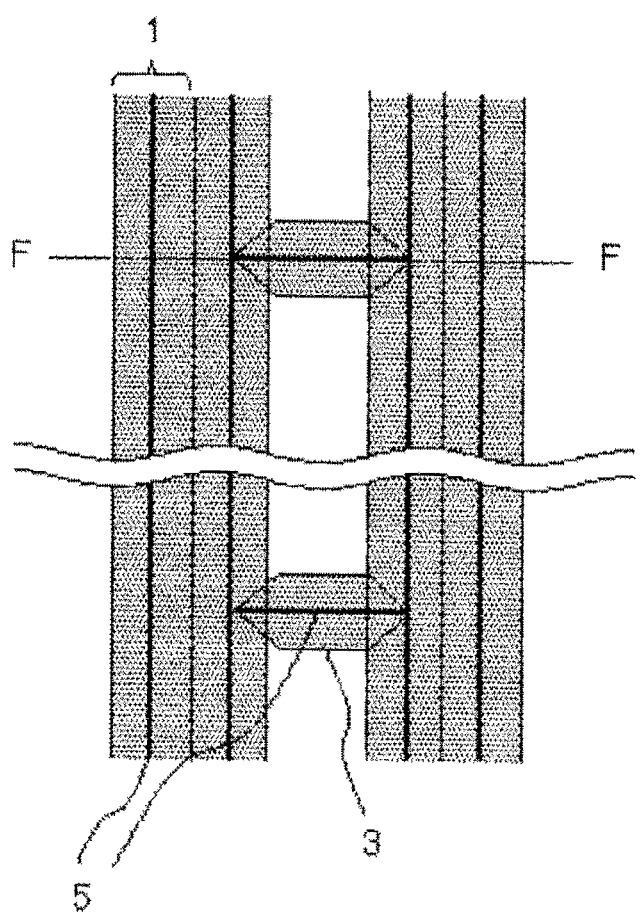
FIG. 40 is an enlarged view illustrating the alignment mark when the height of the structure and the height of the Y-direction cylindrical lens are substantially the same as each other.
Figure 41:
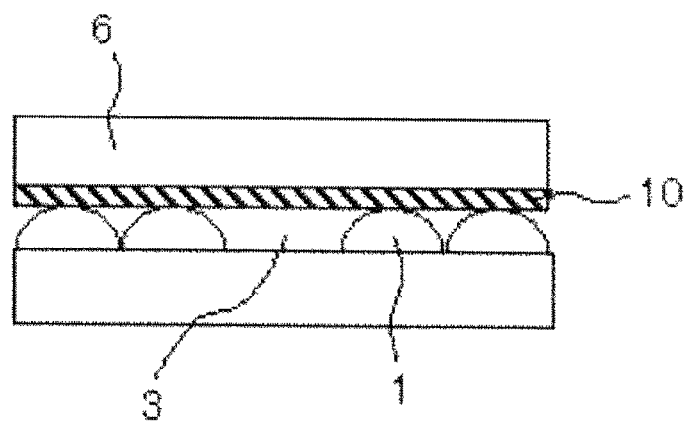
FIG. 41 is a cross-sectional view illustrating the alignment mark after the protection film sheet is bonded to the lenticular lens sheet taken on line F-F' illustrated in FIG. 40.

The structure and the Y-direction cylindrical lens will be described by comparison with the case that the heights thereof are substantially the same as each other. FIG. 40 is an enlarged front view illustrating the alignment mark, when the height of structure 3 and the height of the Y-direction cylindrical lens 1 are substantially the same as each other. When the protection film 6 is bonded to the display surface of the lenticular lens sheet, the structure 3 is also firmly adhered to the adhesive 10 of the protection film 6. FIG. 41 is a cross-sectional view taken on line F-F' of FIG. 40, after the protection film 6 is bonded to the lenticular lens sheet. In this state, when the lenticular lens sheet is made to be in a reduced pressure environment, a relative pressure of air in a space closed by the Y-direction cylindrical lens 1, the structures 3, the protection film 6 and the flat part 2 becomes higher than outdoor air. As a result, the protection film 6 of this region is swollen, it is difficult to see the alignment mark due to an influence by the influx of a gas, or the protection film 6 is peeled off. Meanwhile, in the third embodiment, there is no closed space since the leakage path 7 is provided therein as illustrated in FIG. 39, and thereby problems such as swelling or peeling of the protection film 6 even under a reduced pressure may not occur.

Further, when the protection film is bonded to the lens surface of the lenticular lens sheet of the second embodiment, since only one alignment mark is provided on the extension of the same flat part, the closed space as illustrated in FIG. 40 may not be formed therein. However, by applying the third embodiment to the second embodiment, the leakage path is increased, such that it is possible to more efficiently pull out the air between the lens surface and the protection film under a reduced pressure environment, and more easily execute the bonding process of the lenticular lens sheet with the display panel under a reduced pressure.

Fourth Embodiment

In the fourth embodiment, the lenticular lens sheets according to the first, second and third embodiments are combined with the display panel such as a liquid crystal or organic electroluminescence (EL) or plasma display panel (PDP), to make a stereoscopic display.

Figure 42:
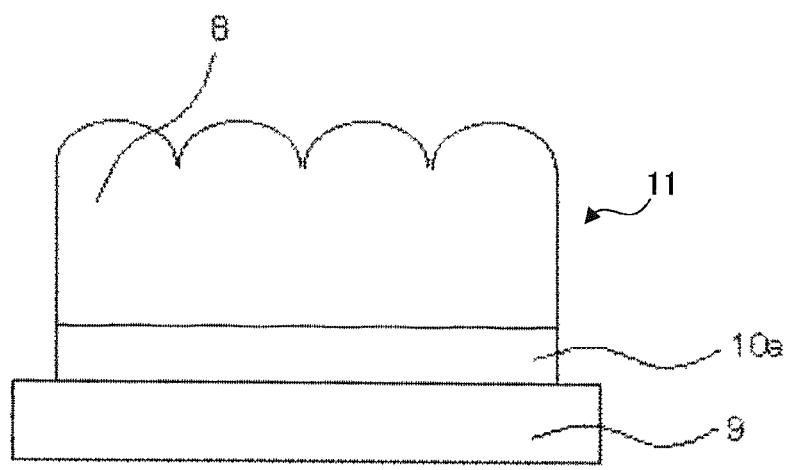
FIG. 42 is a cross-sectional view illustrating a stereoscopic display apparatus of a fourth embodiment.
Figure 43:
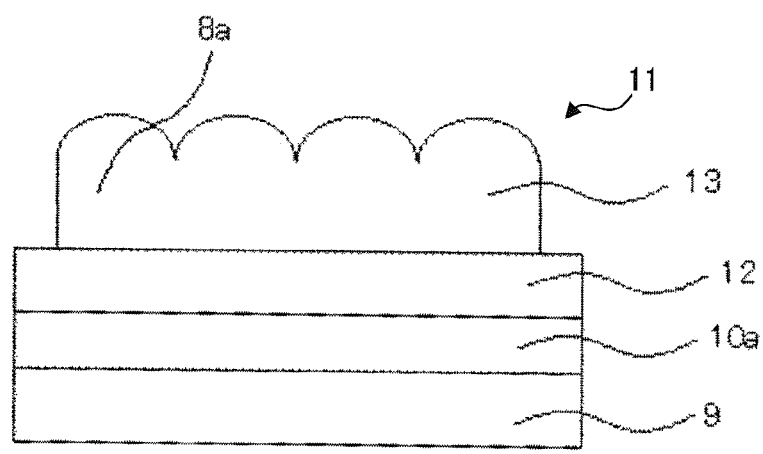
FIG. 43 is a cross-sectional view illustrating another stereoscopic display apparatus of the fourth embodiment.

As illustrated in FIGS. 42 and 43, the lenticular lens sheets 8 and 8a are bonded to the display panel 9 through the adhesive 10a. FIG. 42 is a cross-sectional view illustrating the stereoscopic display apparatus in which the integral lenticular lens sheet 8 as illustrated in FIG. 24 is bonded to the display panel 9. FIG. 43 is a cross-sectional view illustrating the stereoscopic display apparatus in which the lenticular lens sheet 8a using the glass substrate 12 is bonded to the display panel 9. The adhesive 10a may be a liquid adhesive, or film-shaped adhesive. In this case, the cylindrical lenses of the lenticular lens sheets 8 and 8a are installed astride at least two pixels (two columns) of a right-eye pixel and a left-eye pixel. Thus, a stereoscopic display apparatus 11 capable of displaying a stereoscopic image is completed. That is, the stereoscopic display apparatus 11 of the fourth embodiment is provided with the lenticular lens sheet of the first embodiment. In addition, the stereoscopic display apparatus including the lenticular lens sheets of the second and third embodiments may be similarly configured. Further, as described in the third embodiment, the protection film may be attached to the upper surfaces of these lenticular lens sheets.

In the stereoscopic display apparatus of FIGS. 42 and 43, a distance between the lenticular lens sheets 8 and 8a and the pixels of the display panel 9 (referred to as a lens-to-pixel distance) is important to achieve the stereoscopic display. A lens pitch, a pixel pitch, a distance that can allow the easiest viewing of the stereoscopic display (optimum 3D viewing distance), the number of viewpoints, and the like determine the lens-to-pixel distance. The number of viewpoints is the number of different viewpoint images projected in a space for the stereoscopic display. For example, when one lens is installed astride the two pixels of the right-eye pixel and the left-eye pixel, an image of each one viewpoint for the right-eye and left-eye, that is, two viewpoints are projected. Also, for example, when one lens is installed astride the four pixels, an image of four viewpoints is projected, and the number of viewpoints may be changed depending on a relation between the pixel and the lens. In the case of the same optimum 3D viewing distance and the same number of viewpoints, since there is a proportional relationship between the pixel pitch and the lens-to-pixel distance, when the pixel pitch is reduced, it is necessary to reduce the lens-to-pixel distance. In recent years, the display panel has increased in definition, and the lens-to-pixel distance has tended to decrease.

Figure 44A:
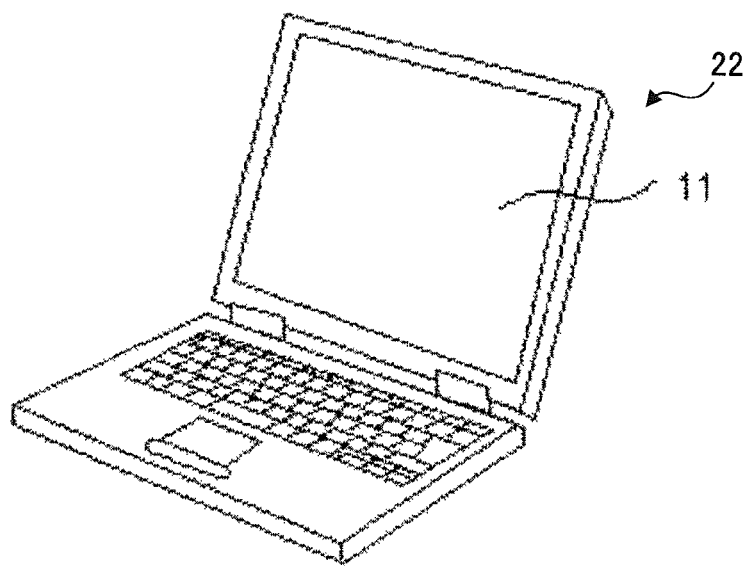
FIG. 44A is a perspective view illustrating a first example of an electronic equipment to which the stereoscopic display apparatus of the fourth embodiment may be applied.
Figure 44B:
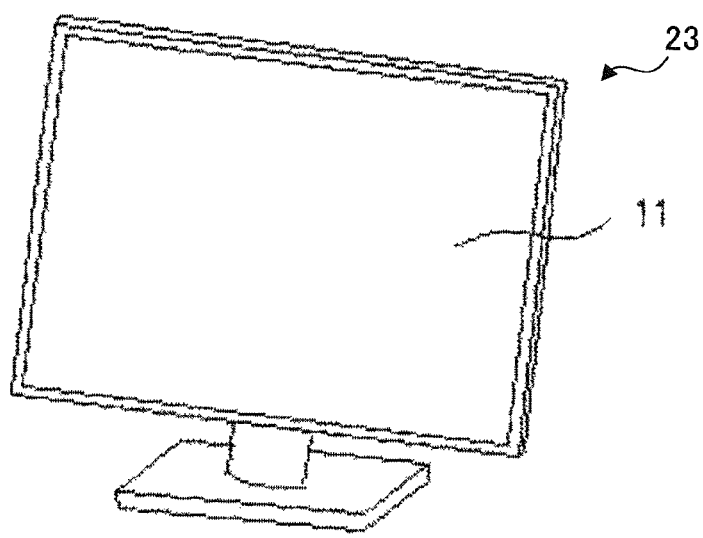
FIG. 44B is a perspective view illustrating a second example of the electronic equipment to which the stereoscopic display apparatus of the fourth embodiment may be applied.
Figure 44C:
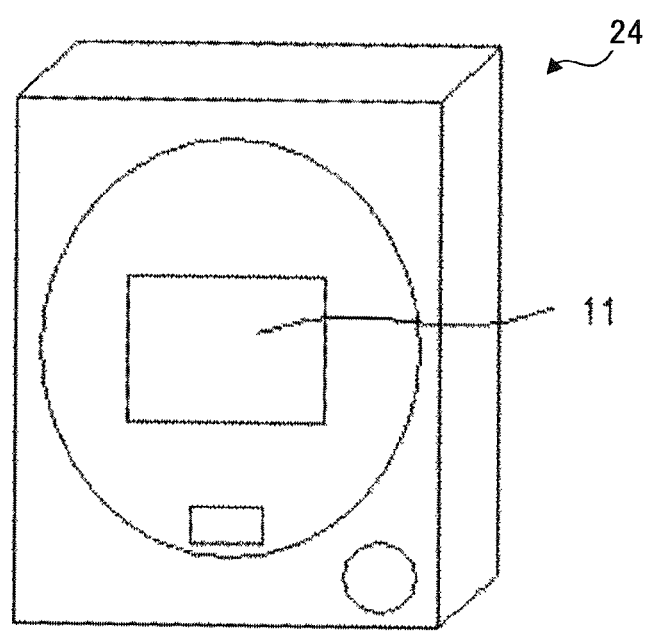
FIG. 44C is a perspective view illustrating a third example of the electronic equipment to which the stereoscopic display apparatus of the fourth embodiment may be applied.

FIGS. 44A to 44C are perspective views illustrating an electronic equipment in which the stereoscopic display apparatus 11 of the fourth embodiment may be applied, wherein FIG. 44A illustrates a personal computer 22 as a first example, FIG. 44B illustrates a television 23 as a second example, and FIG. 44C illustrates a Pachinko machine 24 as a third example.

The stereoscopic display apparatus 11 of the fourth embodiment is not limited thereto, and in addition, may be applied to various electronic equipment such as a mobile phone, a smart phone, a personal digital assistant, a game console, a digital camera, a digital video camera, a car navigation system, a system monitor, a vehicle-mounted monitor and the like. When using the lenticular lens sheet according to the first, second or third embodiment, since it is easy to align the lenticular lens sheet with the display apparatus with high accuracy, productivity is improved. In addition, as compared to the prior art, it is possible to supply the lenticular lens sheet at a low cost. By the above-described fourth embodiment, it is possible to provide the electronic equipment which has excellent visual characteristics and display quality, and is capable of displaying different images from a plurality of viewpoints, at a low cost.

Further, it should be noted that the present invention is not intended to be limited to the description of the above-described respective embodiments, and the configuration thereof may be appropriately modified, without departing from the spirit of the present invention.

The present invention can be used in the lenticular lens sheet, and the display apparatus and the electronic equipment including the lenticular lens sheet.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A lenticular lens sheet, comprising:
   a plurality of cylindrical lenses which extend in a direction parallel to each other; and
   an alignment mark which has two cylindrical lenses among the plurality of cylindrical lenses, a flat part disposed between the two cylindrical lenses, and a structure which is disposed on the flat part and extends between the two cylindrical lenses.

2. The lenticular lens sheet according to claim 1, wherein the structure is any one of a cylindrical lens, a hexahedron, and a prism.

3. The lenticular lens sheet according to claim 1, wherein the structure intersects the flat part in two straight lines, and the two straight lines are parallel to each other.

4. The lenticular lens sheet according to claim 1, wherein the flat part extends in the extending direction of the cylindrical lenses.

5. The lenticular lens sheet according to claim 1, wherein the flat part is present only near the structure.

6. The lenticular lens sheet according to claim 1, wherein one alignment mark is provided on the same flat part.

7. The lenticular lens sheet according to claim 1, wherein the extending direction of the cylindrical lenses is inclined with respect to sides forming an external form of the lenticular lens sheet.

8. The lenticular lens sheet according to claim 1, wherein the cylindrical lenses have a lower surface formed in a flat surface and an upper surface formed in a convex surface, and the structure has a lower height than a height of the cylindrical lenses based on the lower surface.

9. The lenticular lens sheet according to claim 1, wherein two or more alignment marks are provided on the lenticular lens sheet.

10. The lenticular lens sheet according to claim 1, wherein the cylindrical lenses are provided on a glass substrate.

11. A display apparatus, comprising:
    a display panel; and
    the lenticular lens sheet according to claim 1, which is attached to the display panel.

12. The display apparatus according to claim 11, further comprising
    a protection film which is attached to an upper surface of the lenticular lens sheet.

13. An electronic equipment, comprising:
    the display apparatus according to claim 11.

* * * * *